(12) United States Patent
Kouritzin et al.

(10) Patent No.: US 7,188,048 B2
(45) Date of Patent: Mar. 6, 2007

(54) REFINING STOCHASTIC GRID FILTER

(75) Inventors: Michael A. Kouritzin, Edmonton (CA); Surrey Kim, Alberta (CA)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/877,487

(22) Filed: Jun. 25, 2004

(65) Prior Publication Data

US 2005/0071123 A1  Mar. 31, 2005

Related U.S. Application Data

(60) Provisional application No. 60/482,528, filed on Jun. 25, 2003.

(51) Int. Cl.
*G06F 17/18* (2006.01)
(52) U.S. Cl. ...................... 702/181; 700/245
(58) Field of Classification Search ............... 702/181; 297/238; 296/65.09; 700/245, 174; 375/316, 375/341; 166/255.1
See application file for complete search history.

(56) References Cited

U.S. PATENT DOCUMENTS

| 5,933,352 A * | 8/1999 | Salut .................... 700/174 |
| 2002/0198681 A1* | 12/2002 | Kouritzin et al. ........... 702/181 |
| 2004/0161059 A1* | 8/2004 | Andrieu .................... 375/341 |
| 2004/0168797 A1* | 9/2004 | Barrow .................... 166/255.1 |
| 2004/0174939 A1* | 9/2004 | Wang ........................ 375/316 |
| 2004/0249504 A1* | 12/2004 | Gutmann et al. ........... 700/245 |
| 2005/0049830 A1* | 3/2005 | Kouritzin .................... 702/181 |

OTHER PUBLICATIONS

Ballantyne et al., "A hybrid weighted interacting particle filter for multi-target tracking," in *Signal Processing, Sensor Fusion, and Target Recognition XII*, Ivan Kadar (Ed.), *Proceedings of SPIE* vol. 5096 (2003): Title page, Publication page, and pp. 244-255.
Ballantyne et al., "A novel branching particle method for tracking," in *Signal and Data Processing of Small Targets 2000*, Oliver E. Drummond (Ed.), *Proceedings of SPIE* vol. 4048 (2000): 277-287.

(Continued)

*Primary Examiner*—John Barlow
*Assistant Examiner*—Xiuqin Sun
(74) *Attorney, Agent, or Firm*—Mueting, Raasch & Gebhardt, P.A.

(57) ABSTRACT

A method, and program for implementing such method, for use in estimating a conditional probability distribution of a current signal state and/or a future signal state for a non-linear random dynamic signal process includes providing sensor measurement data associated with the non-linear random dynamic signal process. A filter operating on the sensor measurement data by directly discretizing both amplitude and signal state domain for an unnormalized or normalized conditional distribution evolution equation is defined. The discretization of the signal state domain results in creation of a grid comprising a plurality of cells and the discretization in amplitude results in a distribution of particles among the cells via a particle count for each cell.

36 Claims, 29 Drawing Sheets

OTHER PUBLICATIONS

Ballantyne et al., "A Weighted Interacting Particle-based Nonlinear Filter," *Signal Processing, Sensor Fusion, and Target Recognition XI, Ivan Kadar (Ed.), Proceedings of SPIE* vol. 4729 (2002): 236-247.

Ballantyne et al., "Discrete-Space Particle Filters for Reflecting Diffusions," *Proceedings of the 2002 IEEE Aerospace Conference, Big Sky, Montana*, Mar. 9, 2002, pp. 4-1625 to 4-1633.

Bauer et al., "Continuous and Discrete Space Particle Filters for Predictions in Acoustic Positioning," *Image Reconstruction from Incomplete Data II, Philip J. Bauer et al. (Eds.), Proceedings of SPIE*, vol. 4792 (2000): 193-206.

Bhatt et al., "Robustness of the nonlinear filter," *Stochastic Process. Appl.*, vol. 81 (1999) pp. 247-254.

Di Masi et al., "Continuous-Time Approximations for the Nonlinear Filtering Problem," *Appl. Math. And Opt.*, 7: 233-245 (1981).

Kim et al., "A stochastic grid filter for multi-target tracking," in *Signal Processing, Sensor Fusion and Target Recognition XIII, Ivan Kadar (Ed.), Proceedings of SPIE*, vol. 5429 (2004): 245-253.

Kouritzin, "Exact Infinite Dimensional Filters and Explicit Solutions," *Canadian Mathematical Society, Conference Proceedings, Stochastic Models, Proceedings of the International Conference on Stochastic Models in Honour of Professor Donald A. Dawson*, Ottawa, Canada, Jun. 10-13, 1998, Gorostiza et al. (Eds.), vol. 26 (2000): 265-282.

Kouritzin et al., "Markov chain approximations to filtering equations for reflecting diffusion processes," *Stochastic Processes and their Applications*, 110 (2004): 274-294.

Kushner, "A Robust Discrete State Approximation to the Optimal Nonlinear Filter for a Diffusion," *Stochastics*, vol. 3 (1979): 75-83.

* cited by examiner

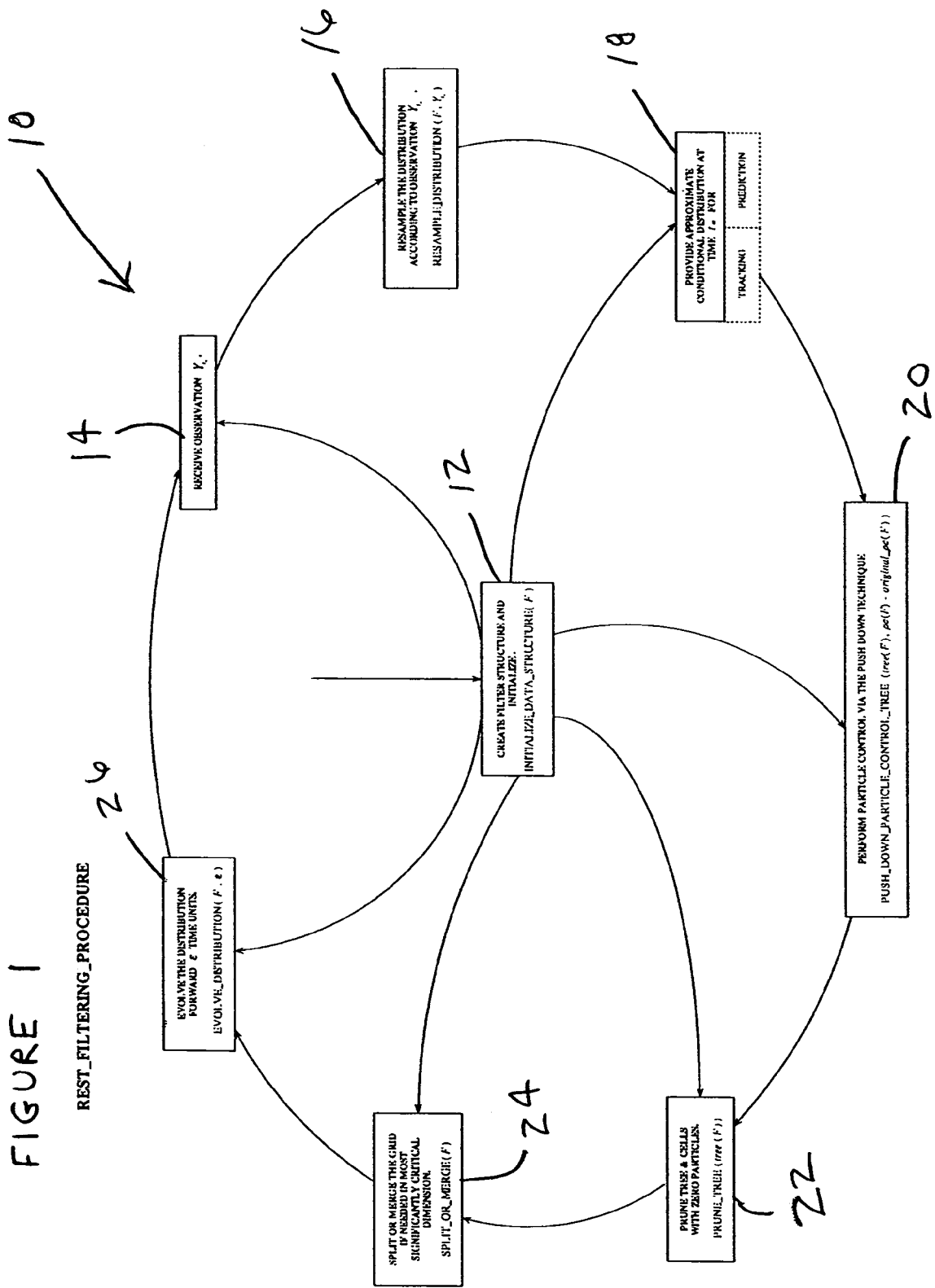

FIGURE 2A : INITIALIZE_DATA_STRUCTURE ( $F$ )

Refining Stochastic Grid Filter Data Structure $F$

| Symbol | Description |
|---|---|
| $N(F)$ or $N(F, i), \forall i_{0 \leq i < d}$ | The number partitions for each dimension represented as an integer vector, and referred to as the filter's grid |
| $tree(F)$ | A reference to the DIBE-indexed tree root. All cells are stored as leaf nodes in the tree. |
| $live\_cells\ (F)$ | The set of all existing cells ( i.e. live cells ). |
| $number\_of\_live\_cells\ (F)$ | The total number of live cells or an integer number corresponding to size of $live\_cells\ (F)$. |
| $original\_pc(F)$ | A filter's parameter for the initial particle count (i.e. the original particle count). |
| $number\_of\_events\ (F)$ | A filter's parameter for the number of simultaneous events to push down, used in EVOLVE_DISTRIBUTION. |
| $dimension\_order\ (F, i), \forall i_{0 \leq i < d}$ | An array to keep track of the dynamic dimension order. A direct consequence from the refining the grid one dimension at a time. |
| $live\_cells\_lower\_bound\ (F)$ | A filter's parameter for the lower bound of the number of live cells before the grid splits. Used in SPLIT_OR_MERGE. |
| $live\_cells\_upper\_bound\ (F)$ | A filter's parameter for the upper bound of the number of live cells before the grid merges. Used in SPLIT_OR_MERGE. |
| $pc\_rate(F)$ | A particle control rate during REST's evolution. Used in EVOLVE_DISTRIBUTION. |
| $bits\ (F)$ | Number of binary digits to represent the maximum grid partition $N(F)$ |

Recursive Tree Node Data Structure $\eta_T$

| Symbol | Description |
|---|---|
| $parent(\eta_T)$ | A parent tree node reference. The definition for a binary tree structure. |
| $left\ (\eta_T)$ | A left child node reference to a tree or cell node structure. The definition for a binary tree (i.e. a reference to the left sub-tree). |
| $right\ (\eta_T)$ | A right child node reference to a tree or cell node structure. The definition for a binary tree (i.e. a reference to the right sub-tree). |
| $level\ (\eta_T)$ | A tree node level. |
| $index\ (\eta_T)$ | Tree Node DIBE index $\quad index(\eta_T) = index(left(\eta_T))$ |
| $pc\ (\eta_T)$ | Tree Node's $\quad pc\ (\eta_T) = pc\ (left\ (\eta_T)) + pc\ (right\ (\eta_T))$ summed particle count |
| $\lambda\ (\eta_T)$ | Tree Node's total summed rate $\quad \lambda\ (\eta_T) = \lambda(left\ (\eta_T)) + \lambda(right\ (\eta_T))$ |
| $O\ (\eta_T)$ | Tree Node's total observation times $\quad O\ (\eta_T) = O(left\ (\eta_T)) + O(right\ (\eta_T))$ |
| $clone\ (\eta_T)$ | A reference to a cloned version of the current tree node. Used in SPLIT_TREE |

FIGURE 2B : INITIALIZE_DATA_STRUCTURE ( $F$ )

| Cell Node Data Structure $\eta_c$ | |
|---|---|
| Symbol | Description |
| $parent(\eta_c)$ | A parent tree node reference. The recursive definition for a binary tree structure. |
| $level(\eta_c)$ | Cell node level (corresponding to the depth of a leaf node of a full non-pruned DIBE index binary tree ). $level(\eta_c) = bits(F) \times d$ |
| $neighbour(\eta_c, \pm e_i), i = 0, 1, \ldots d-1$ | Neighbouring cell nodes : An array of references to neighbours in all positive and negative directions. |
| $coords(\eta_c, i), \forall i_{0 \le i < d-1}$ | Cell coordinates : unique d-dimensional vector of integers corresponding to the current cell's grid point on the signal domain. |
| $index(\eta_c)$ | DIBE index : dimensionally interleaved binary bit expansions corresponding to cell's coordinates. |
| $\rho c(\eta_c)$ | Cell's particle count to represent a small mass of the conditional distribution. |
| $\lambda_{birth}(\eta_c)$ | Cell's birth rate. |
| $\lambda_{death}(\eta_c)$ | Cell's death rate. |
| $\lambda_{birth}^{neighbour}(\eta_c, \pm e_i), l = 0, 1, \ldots d-1$ | Non-existing neighbours' birth rates. |
| $\lambda(\eta_c)$ | Current cell's total rate (including the non-existing neighbours' rates) : $\lambda(\eta_c) = \lambda_{birth}(\eta_c) + \lambda_{death}(\eta_c) + \sum_{l=0}^{l=0} \lambda_{birth}^{neighbour}(\eta_c, \pm e_l)$ |
| $O_{birth}(\eta_c)$ | Imaginary birth time. |
| $O_{death}(\eta_c)$ | Imaginary death time. |
| $O(\eta_c)$ | Cell's total imaginary time : $O(\eta_c) = O_{birth}(\eta_c) + O_{death}(\eta_c)$ |
| $clone(\eta_c)$ | A reference to a cloned version of the current cell node. Used in SPLIT_CELL. |

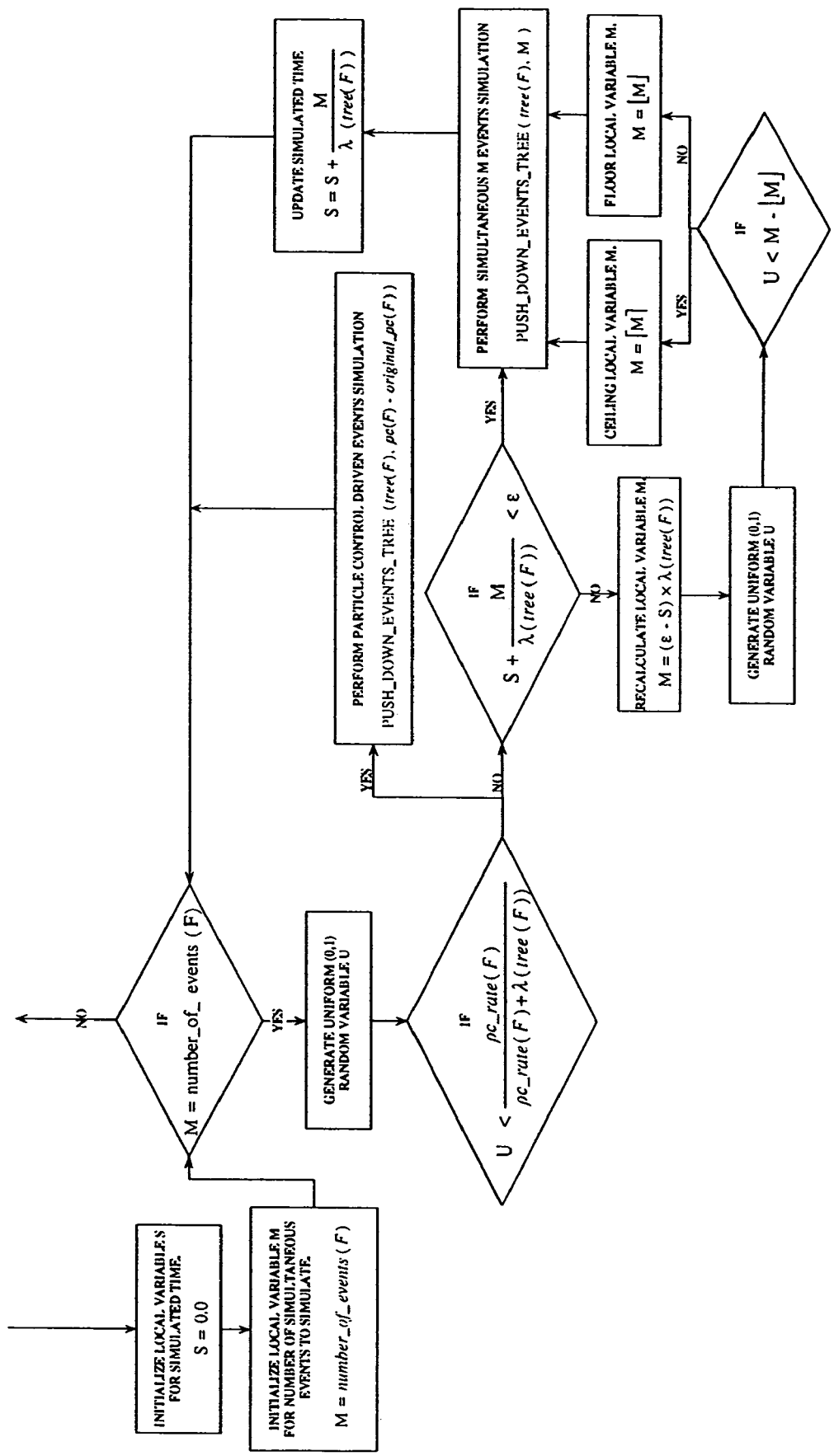
FIGURE 3 : EVOLVE_DISTRIBUTION(F, ε)

FIGURE 4 : PUSH_DOWN_EVENTS_TREE ( $\eta_T$ , events )
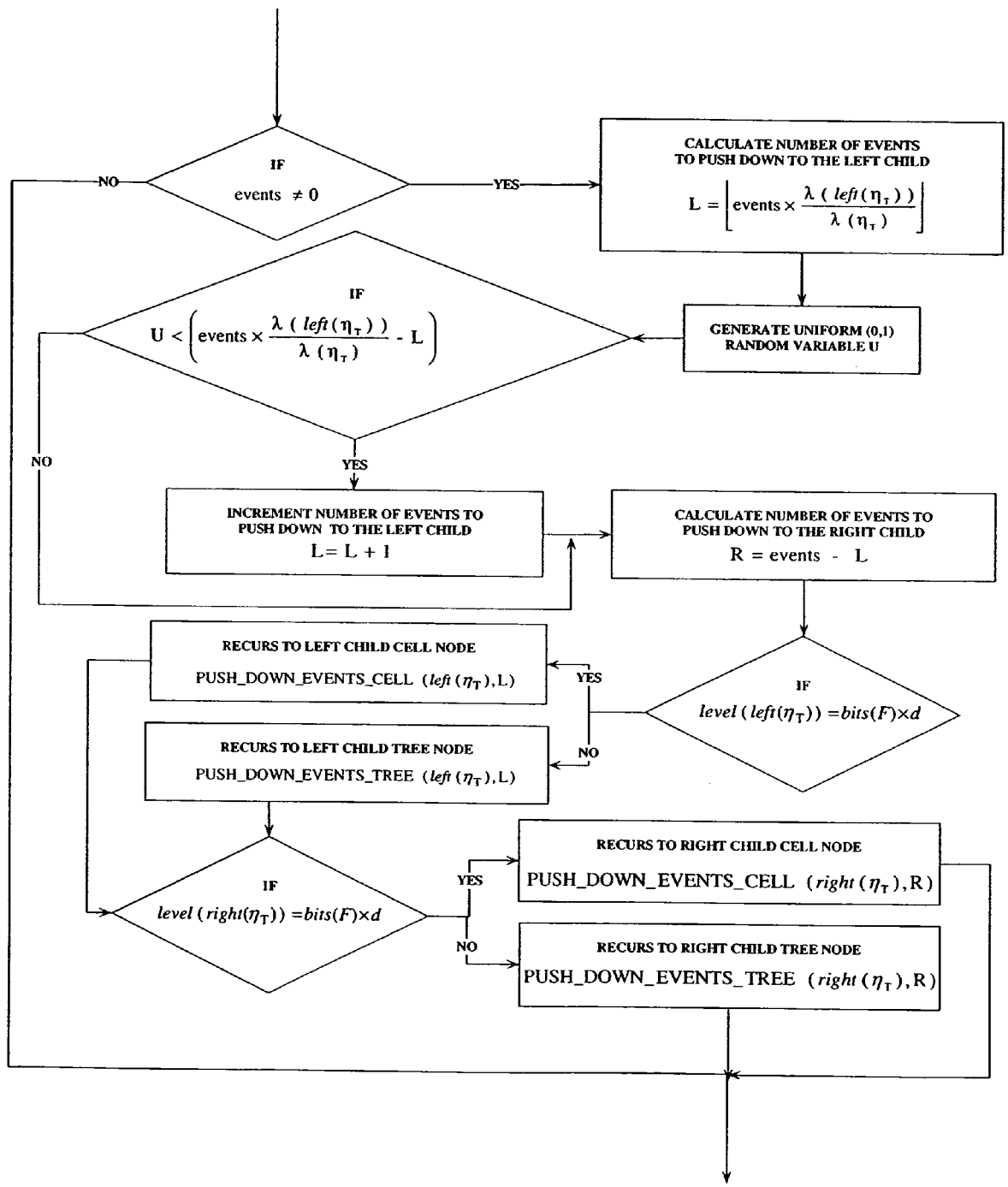

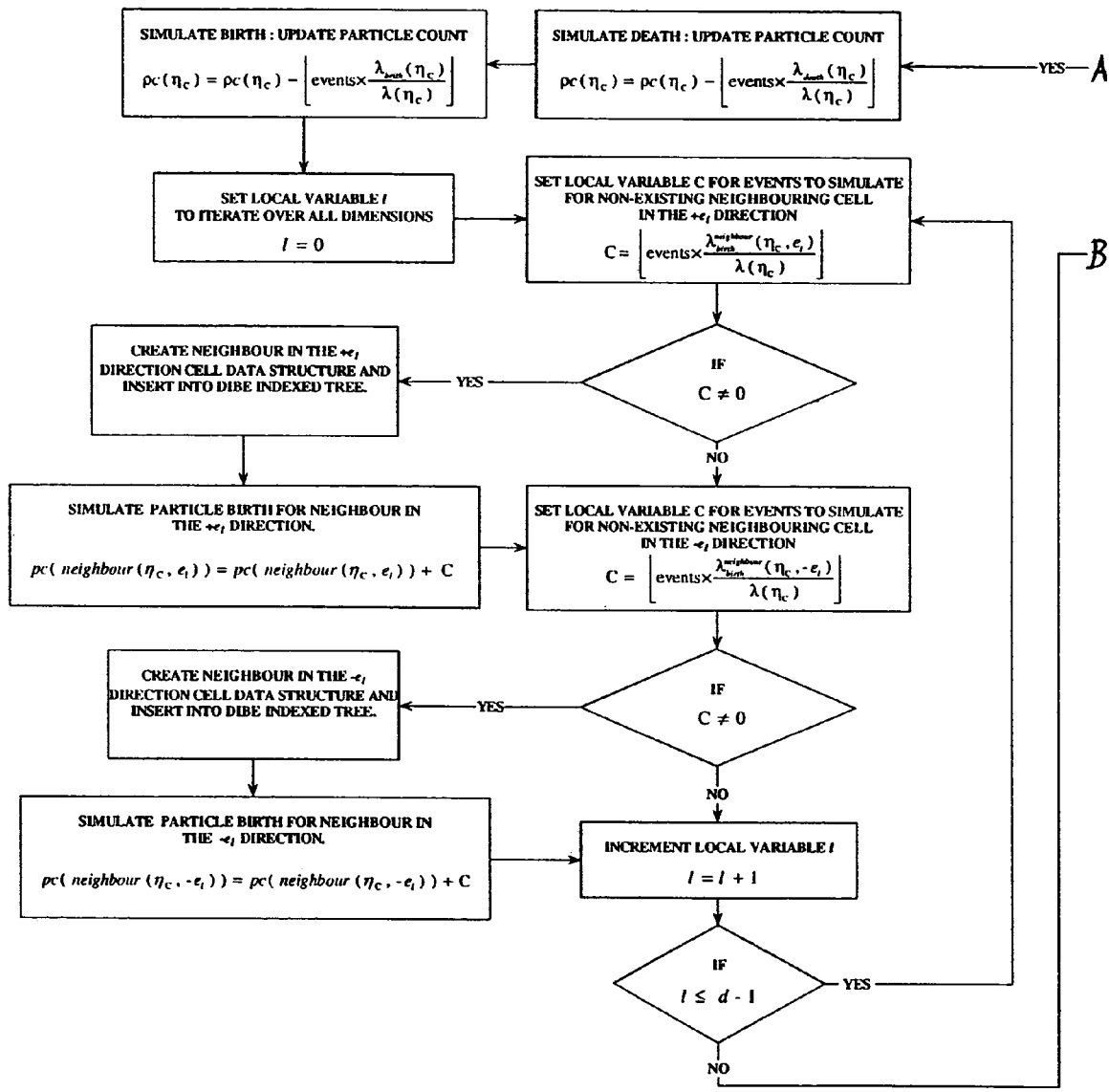
FIGURE 5A: PUSH_DOWN_EVENTS_CELL( $\eta_c$ , events )

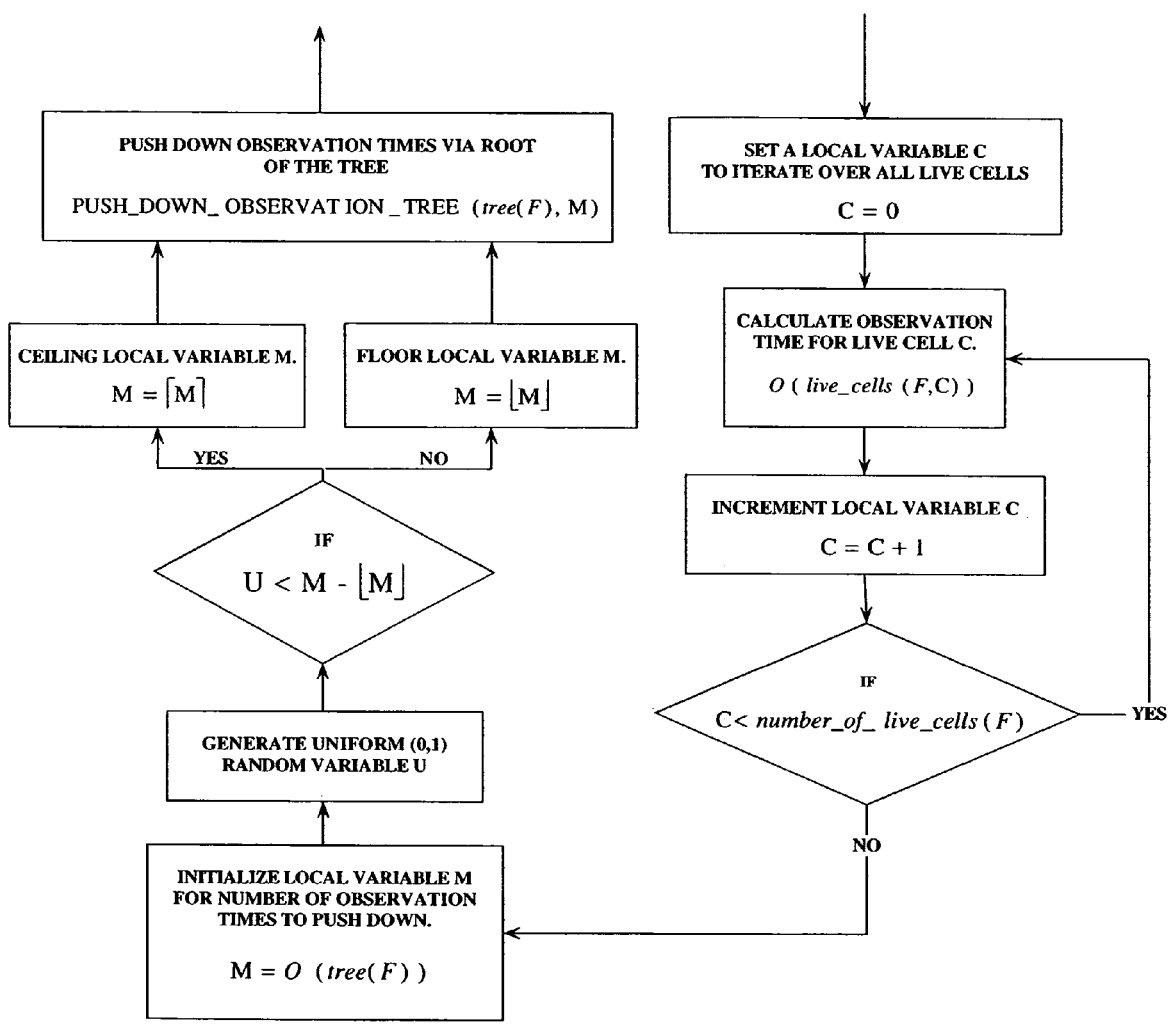
FIGURE 6 : RESAMPLE_DISTRIBUTION ($F$, $Y_{t_-}$)

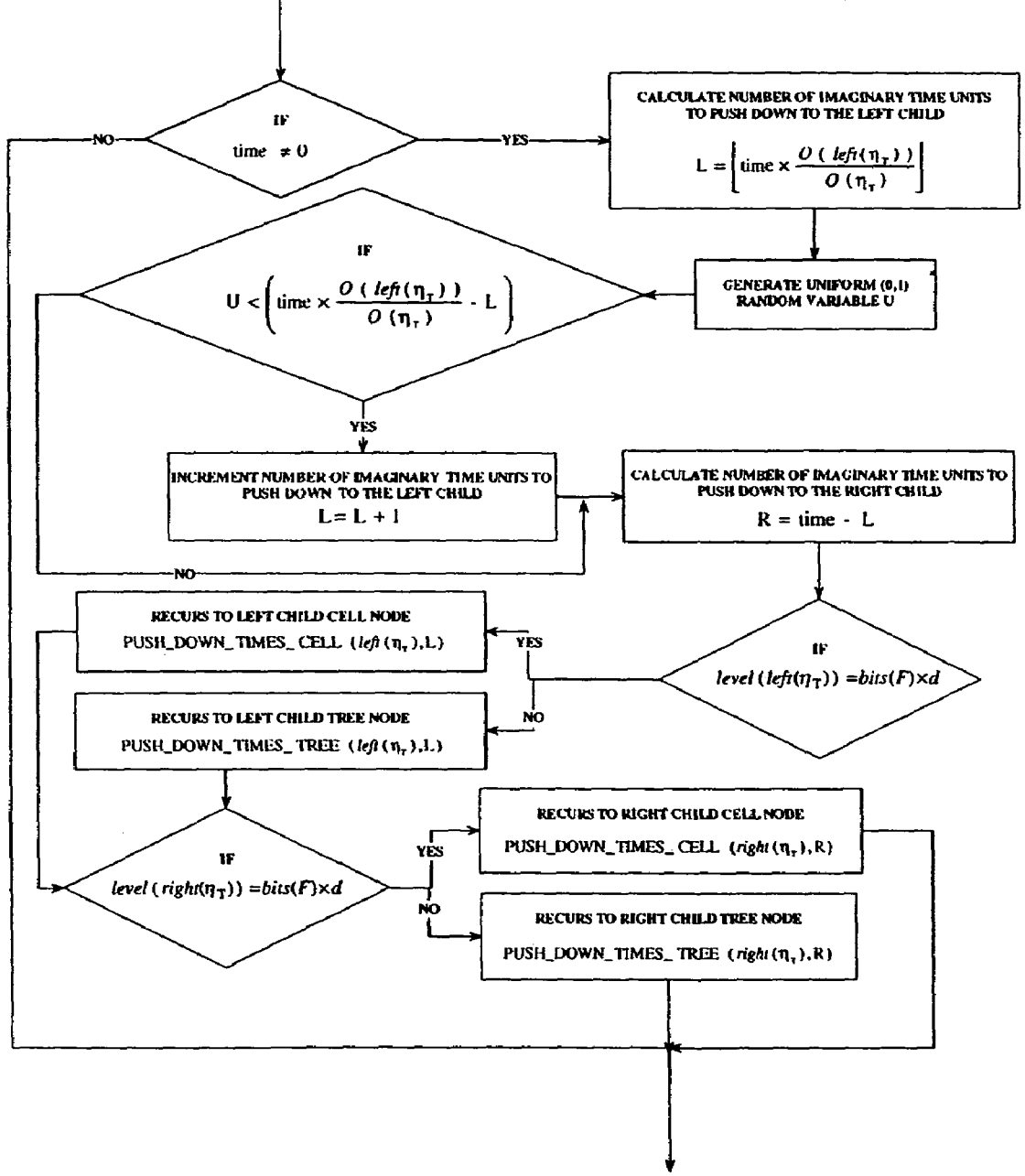

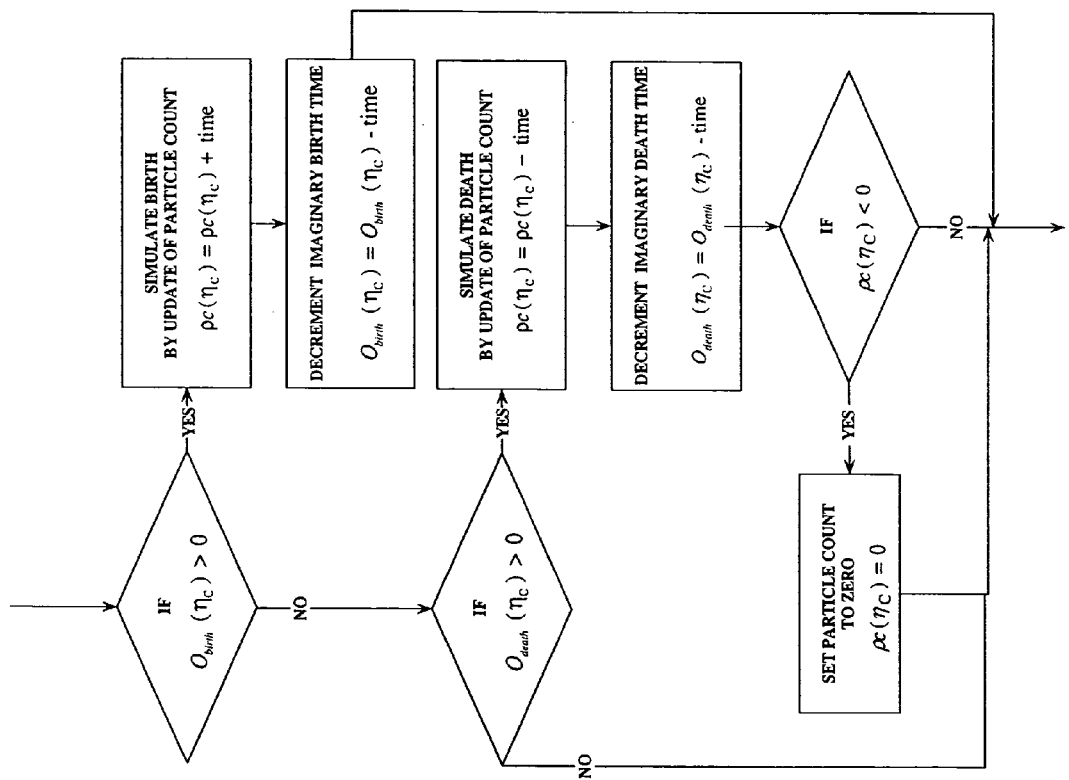
FIGURE 8 : PUSH_DOWN_TIMES_CELL ( $\eta_C$ , time )

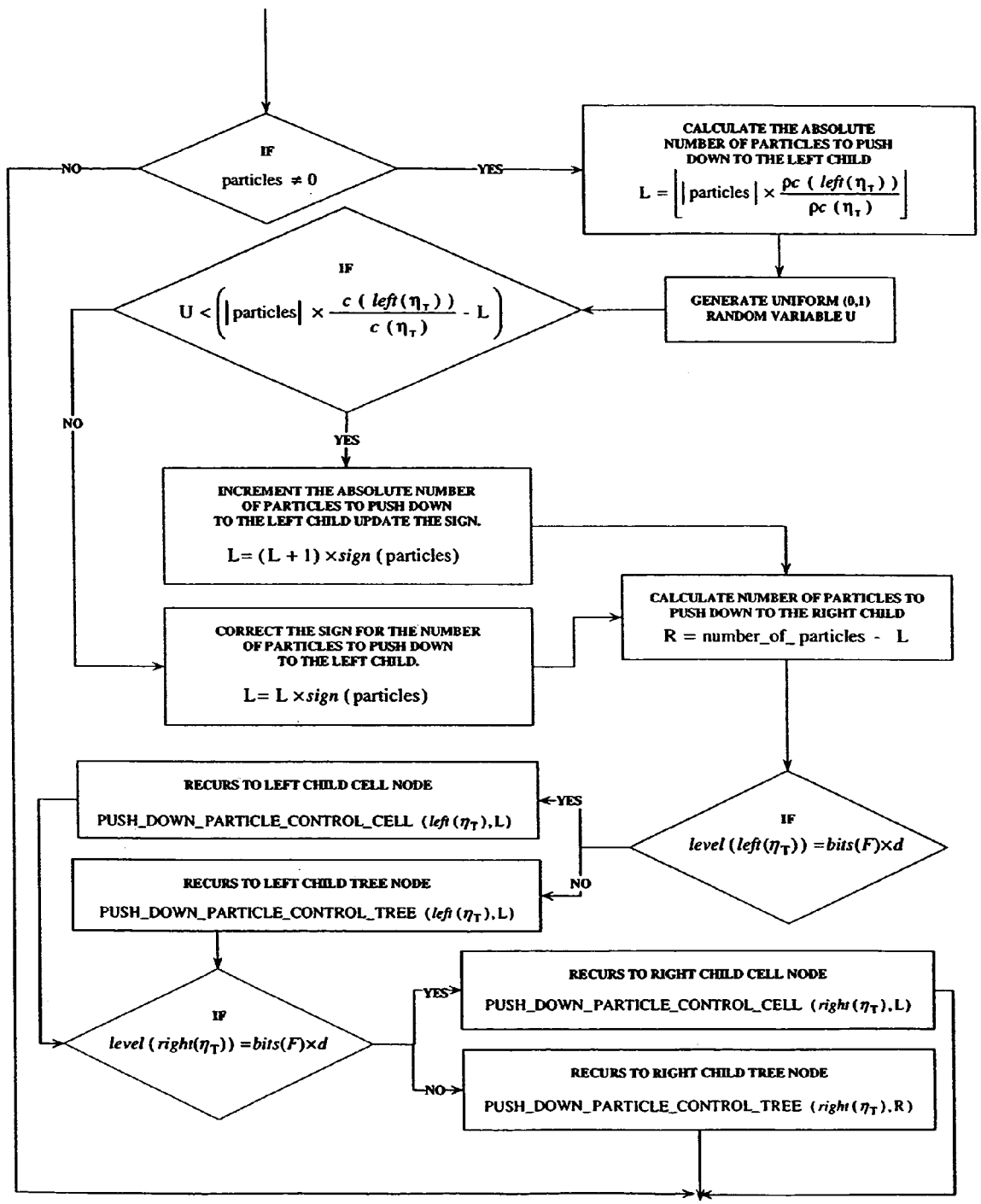
FIGURE 9 : PUSH_DOWN_PARTICLE_CONTROL_TREE ( $\eta_T$, particles )

FIGURE 10 : PUSH_DOWN_PARTICLE_CONTROL_CELL ( $\eta_c$, particles )
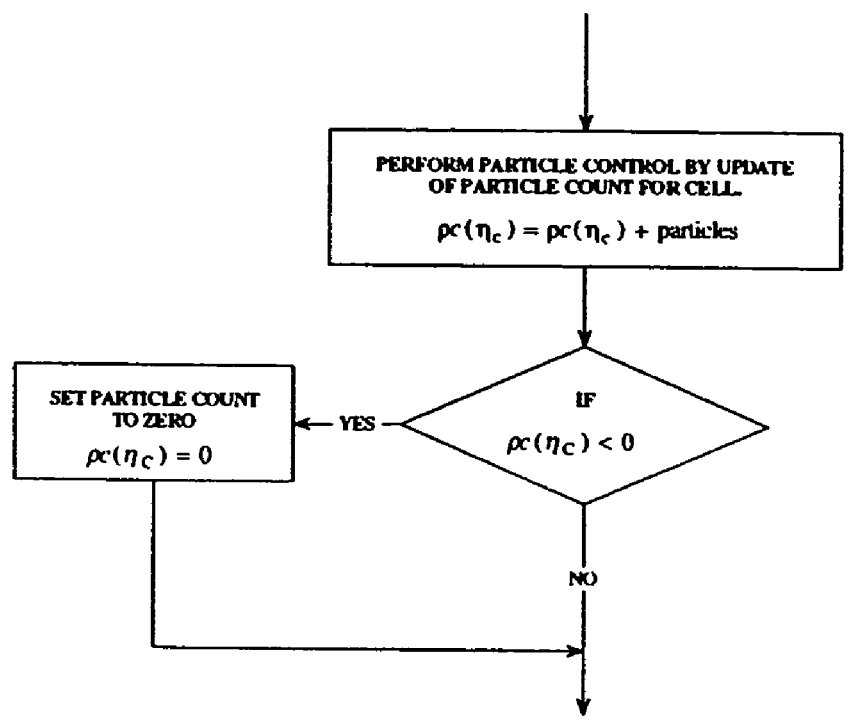

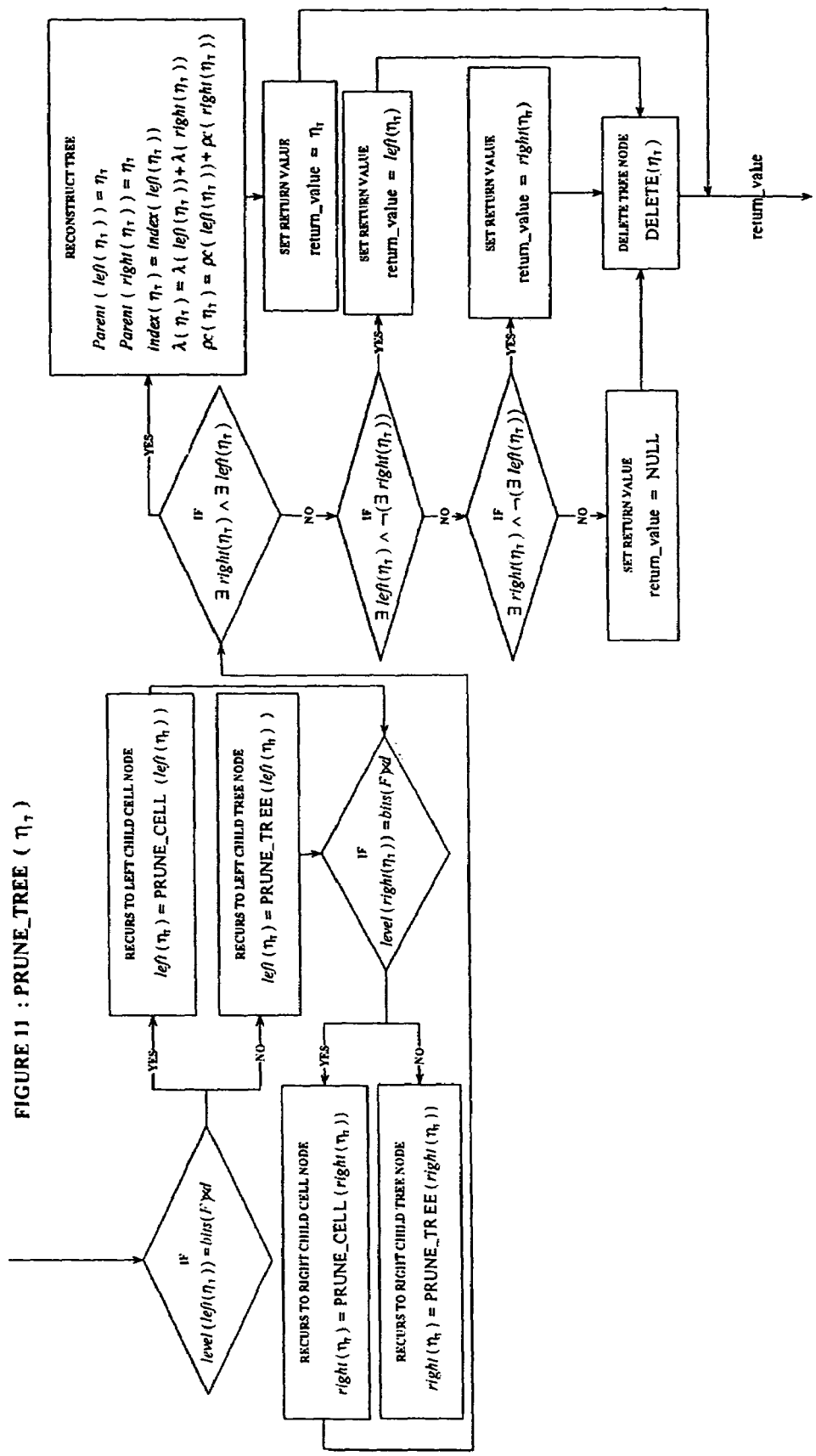

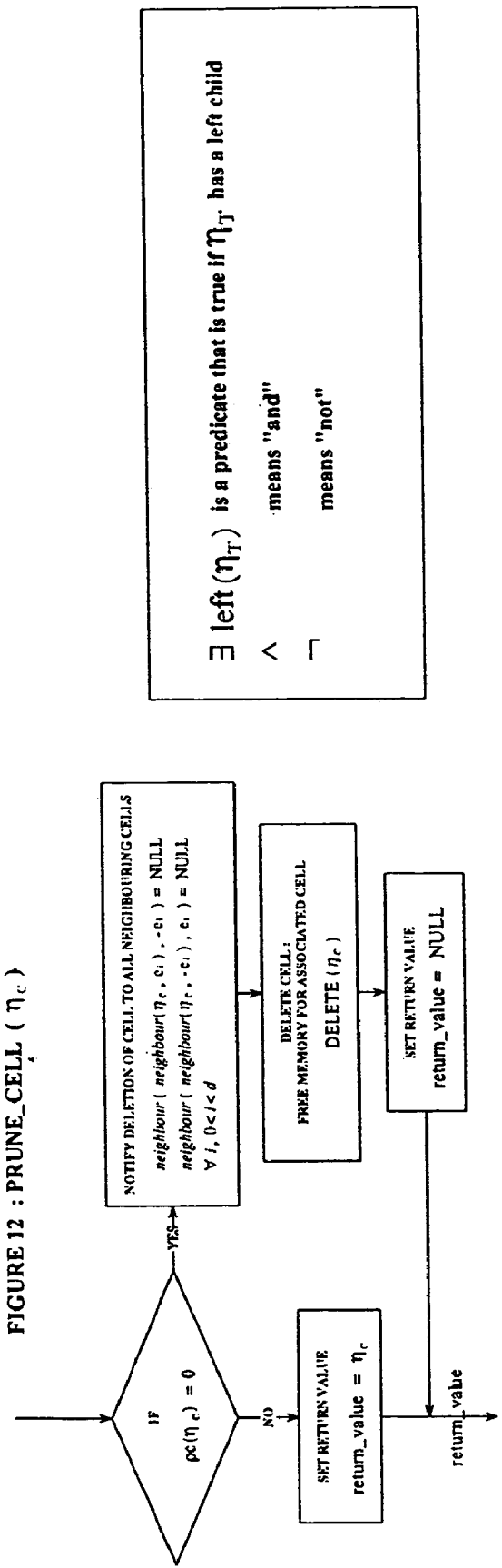
FIGURE 12 : PRUNE_CELL ($\eta_c$)

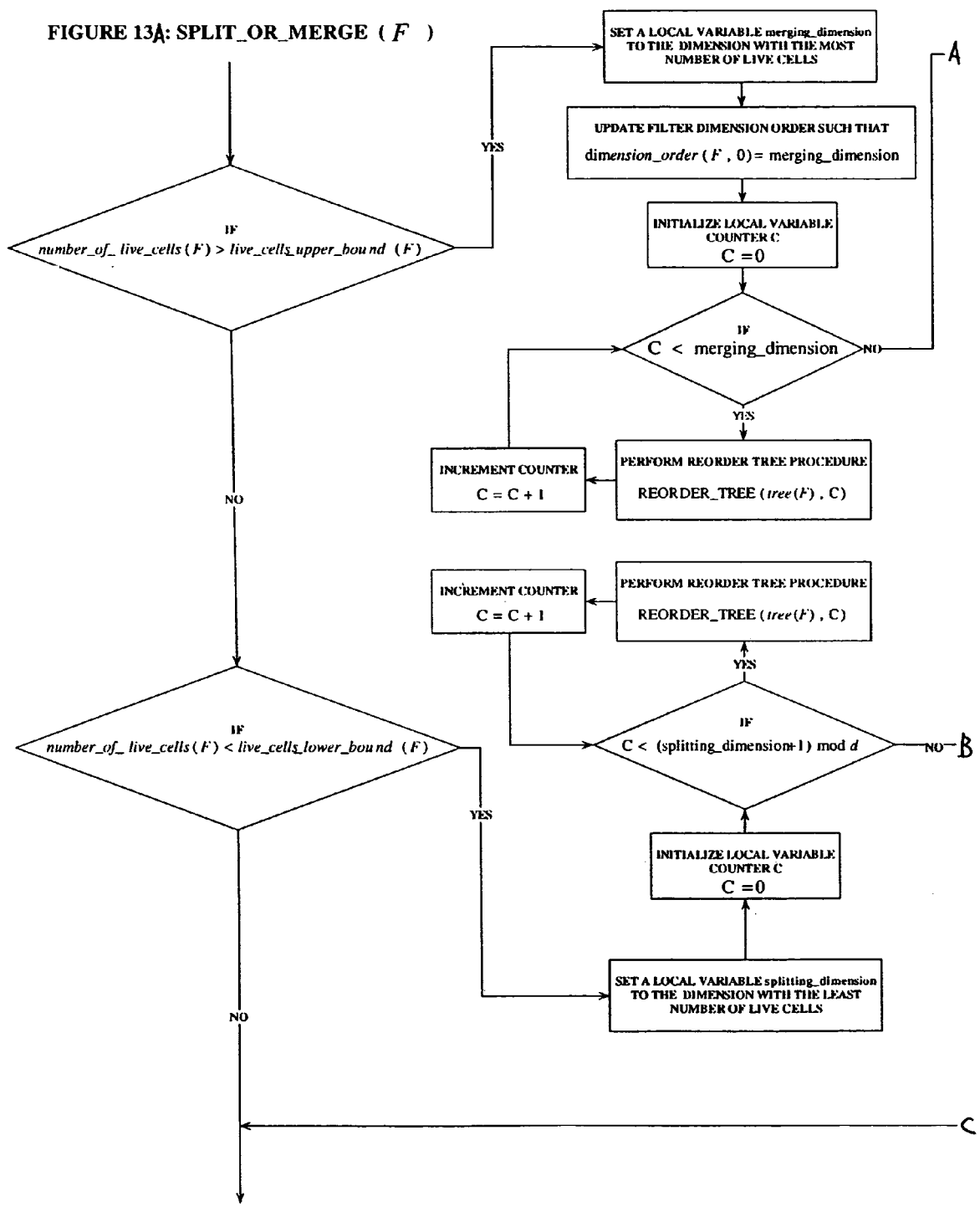

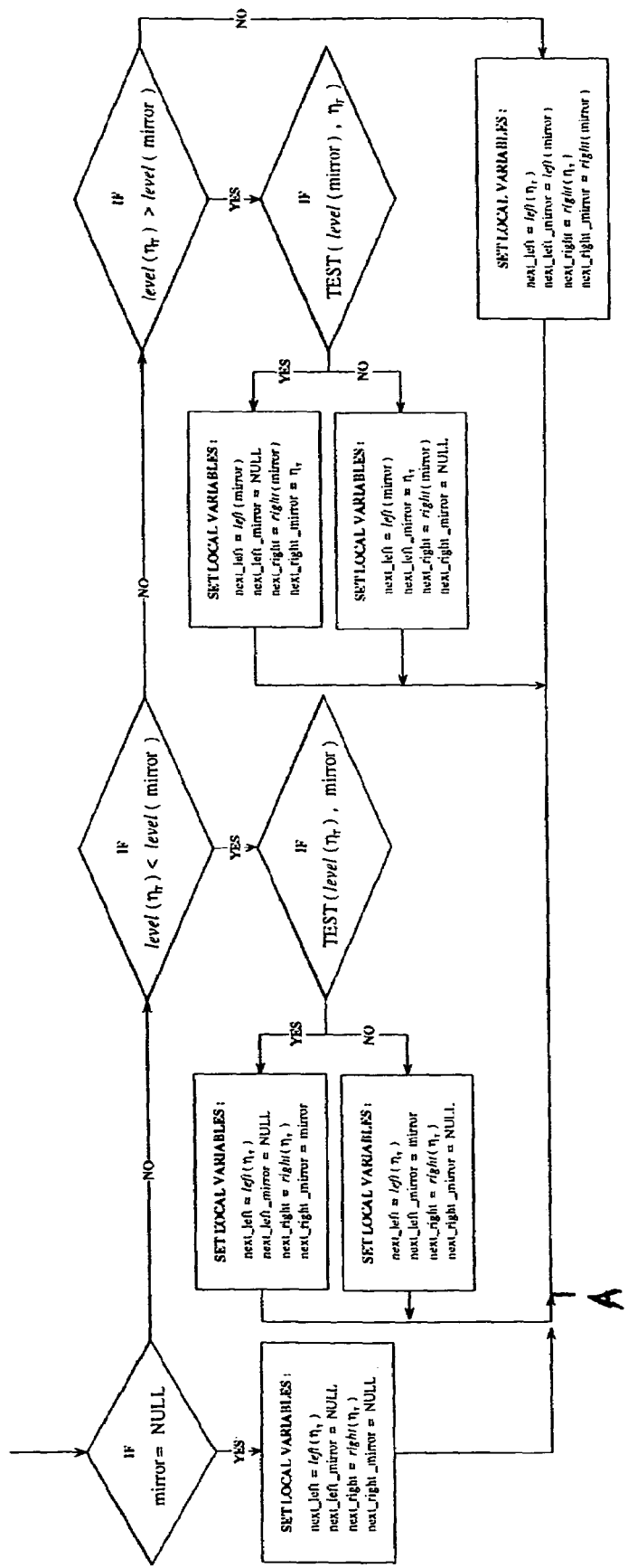
FIGURE 14A: MERGE_TREE ($\eta_T$, mirror, merge_index)

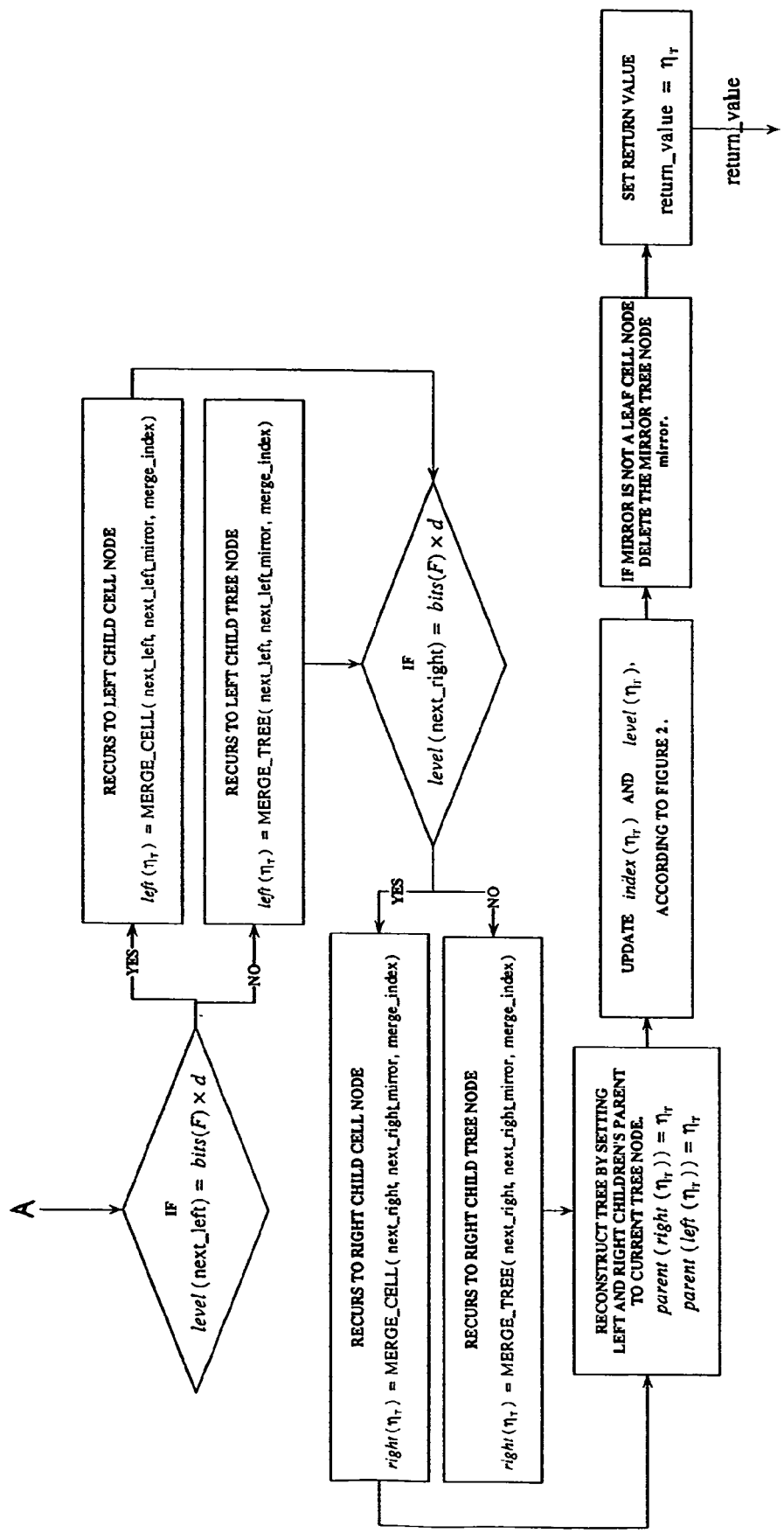
FIGURE 14B : MERGE_TREE ($\eta_T$, mirror, merge_index)

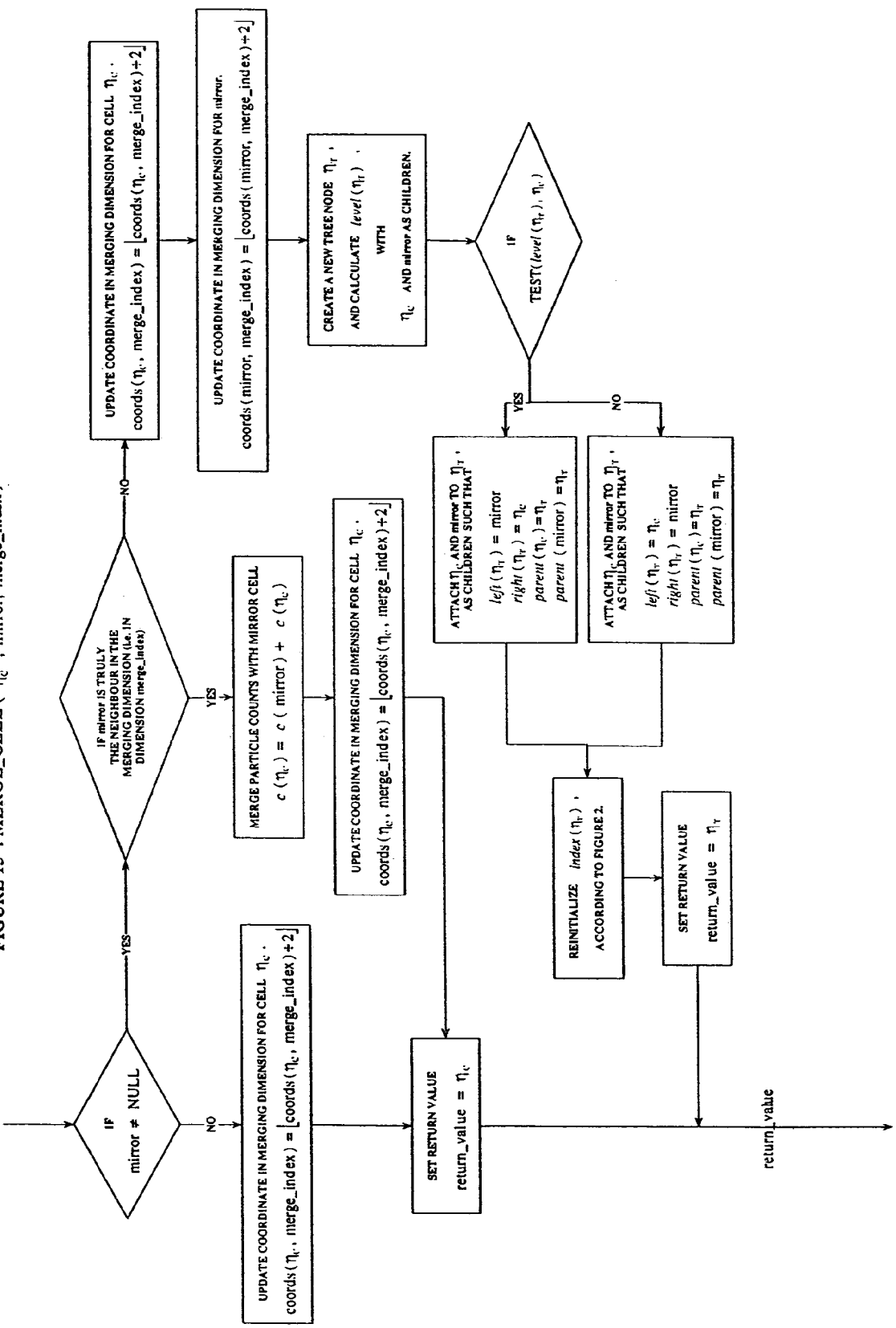

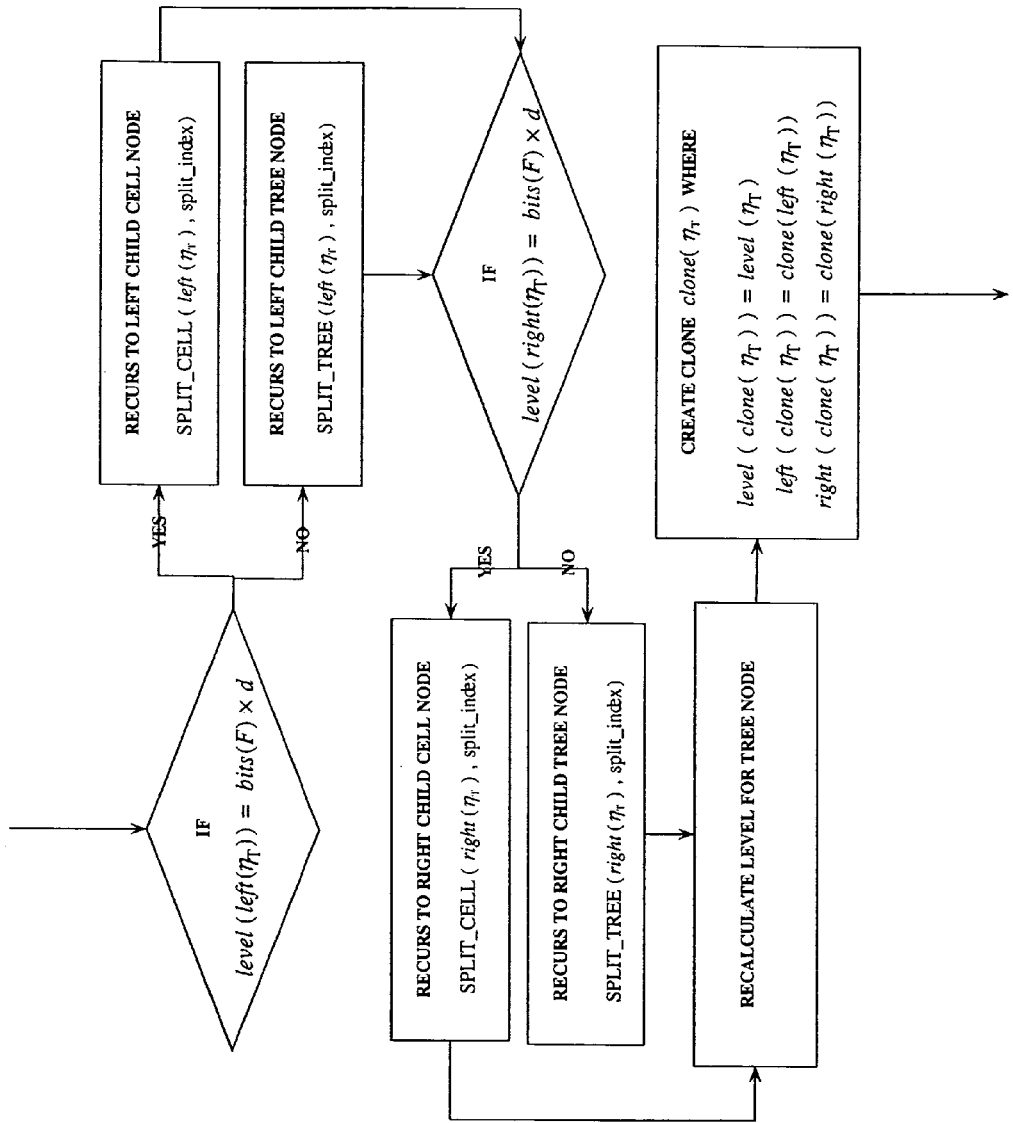
FIGURE 16 : SPLIT_TREE ( $\eta_T$ , split_index )

FIGURE 17 : SPLIT_CELL ( $\eta_c$ , split_index )
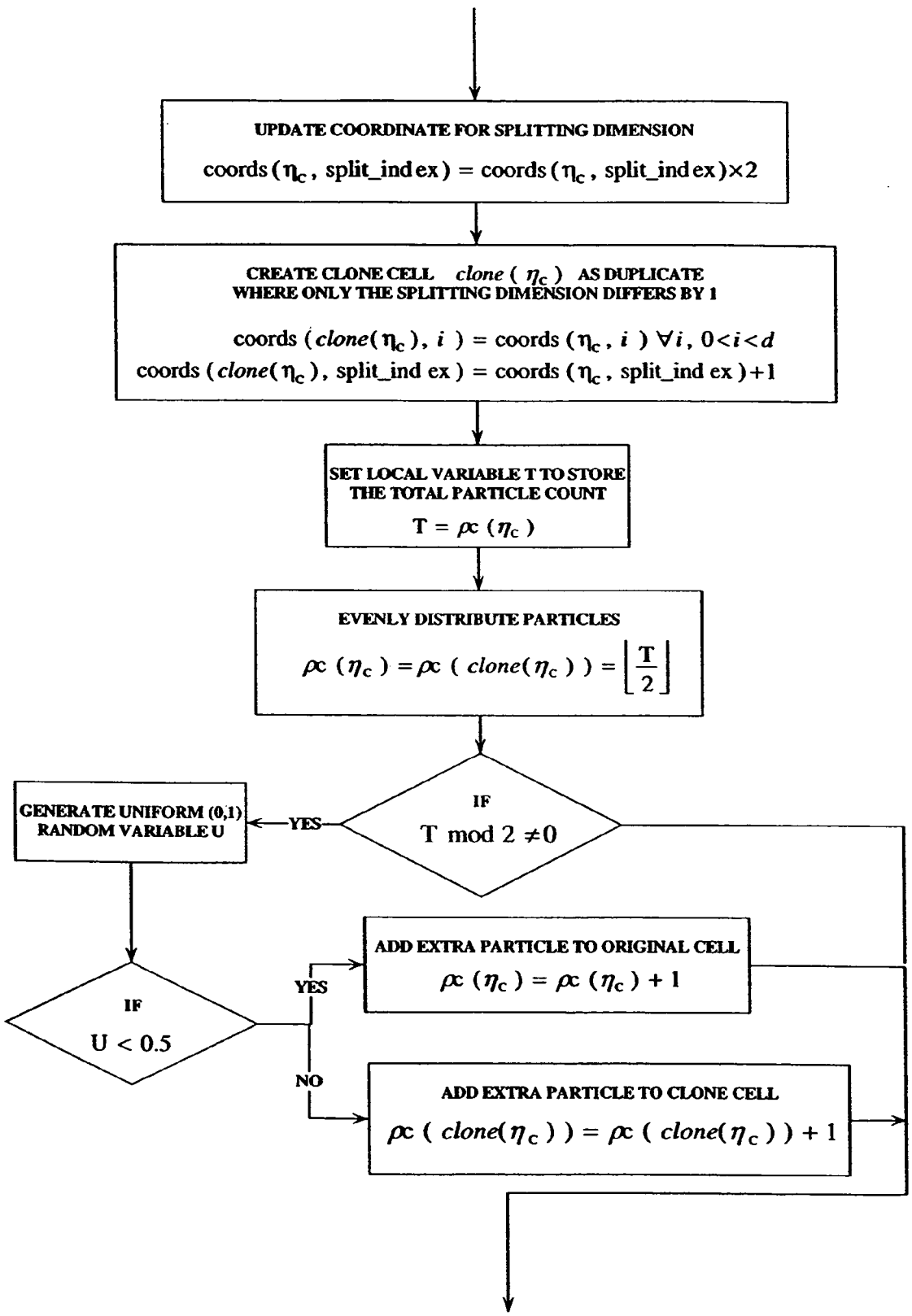

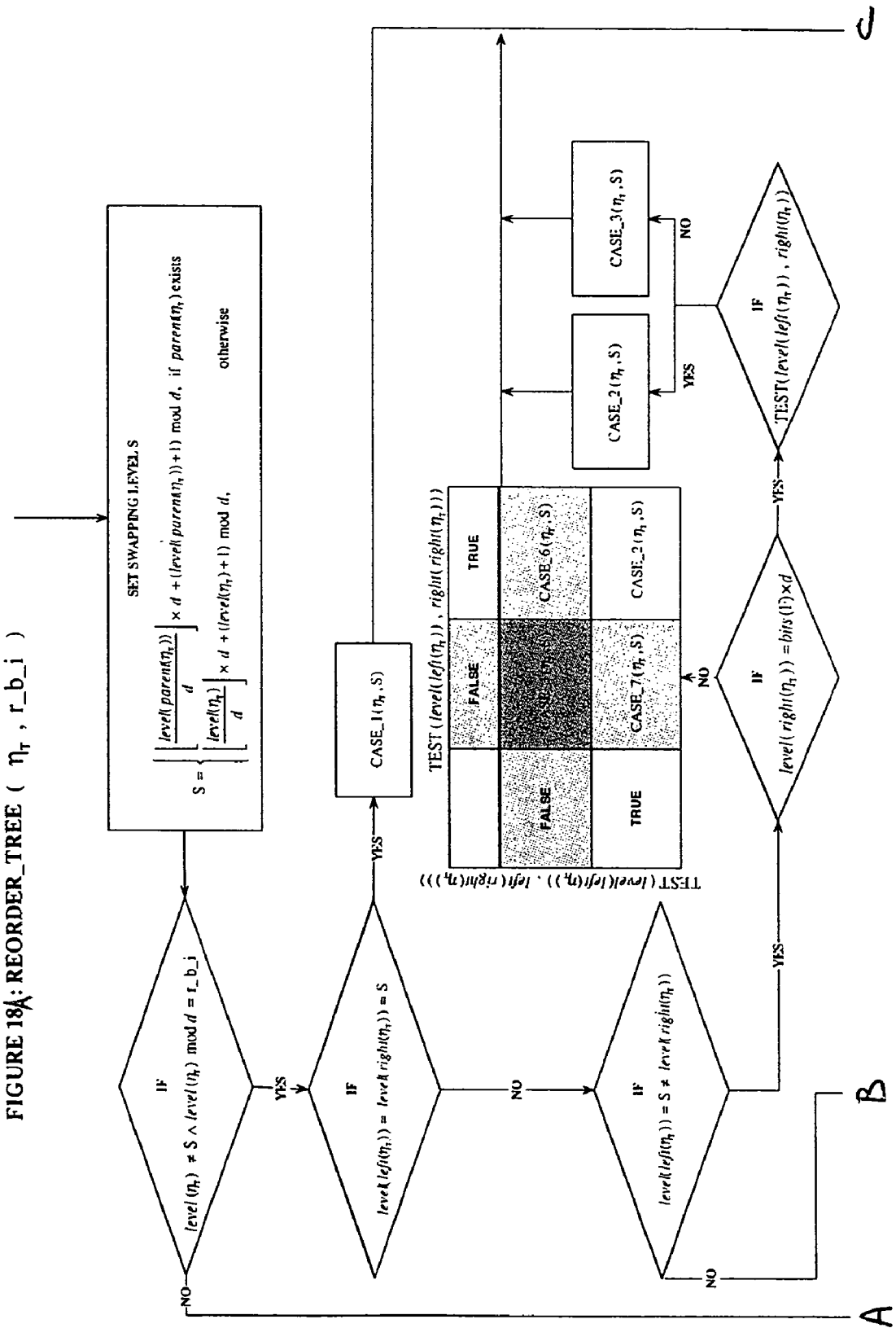
FIGURE 18A: REORDER_TREE ( $\eta_T$ , r_b_i )

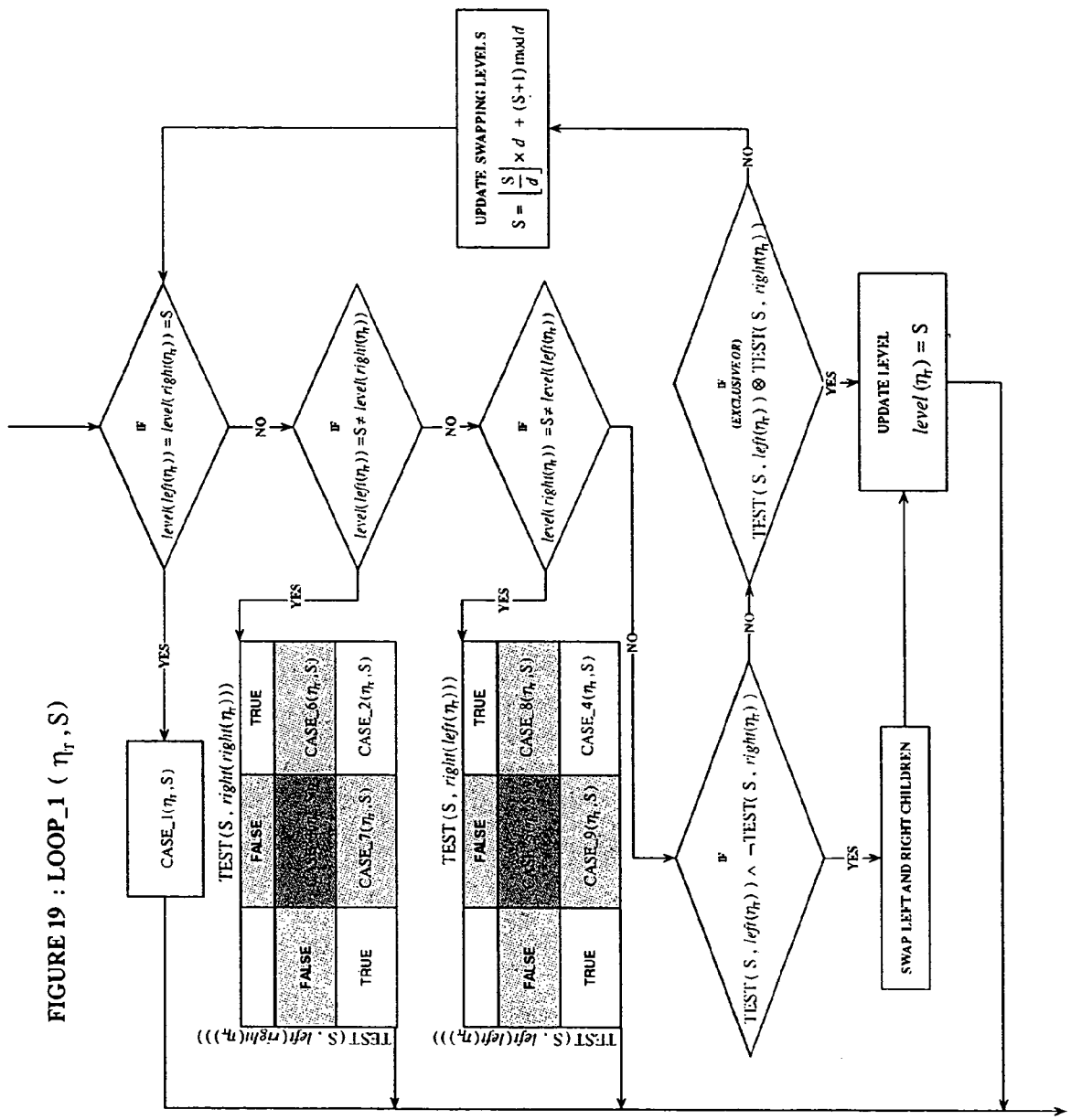

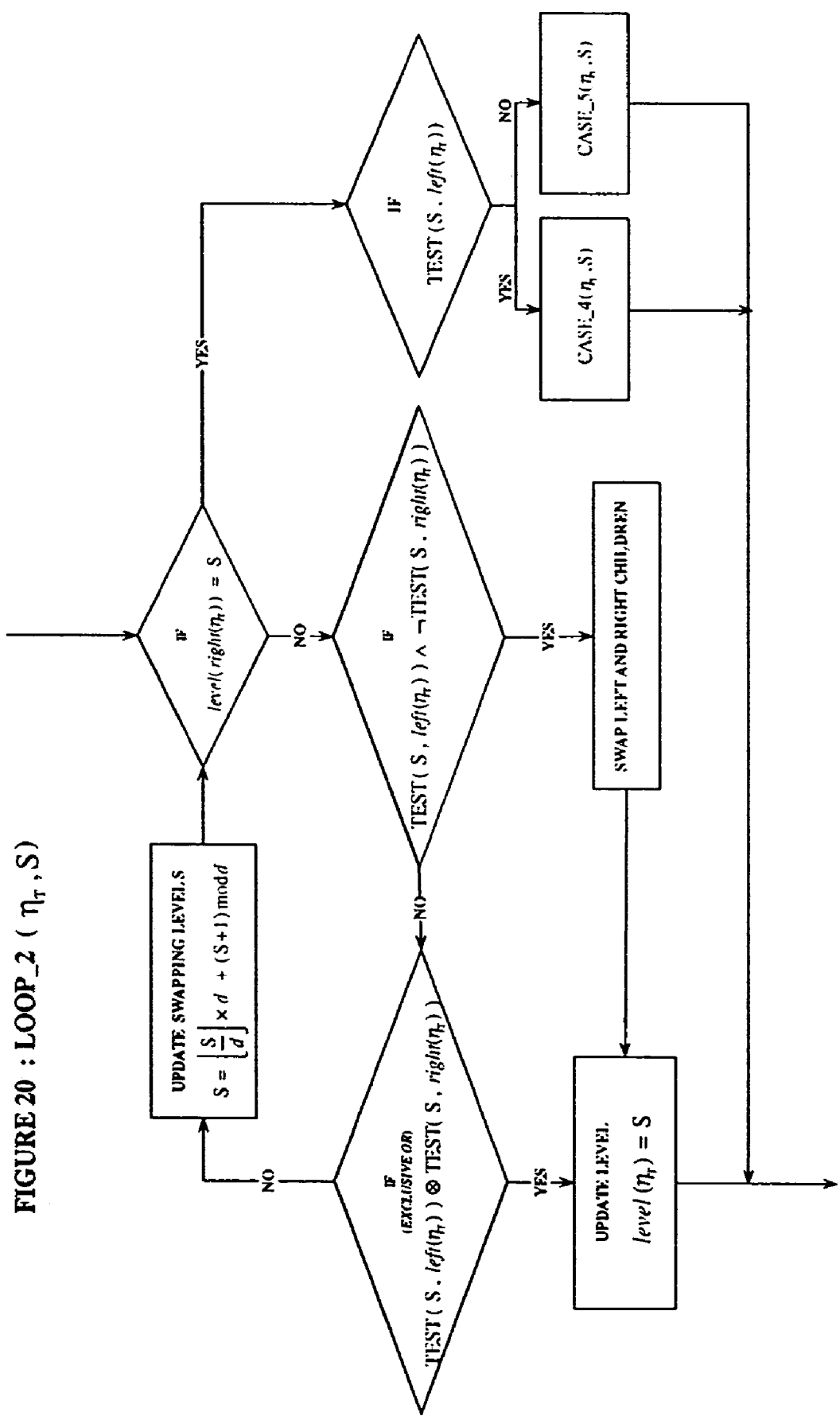

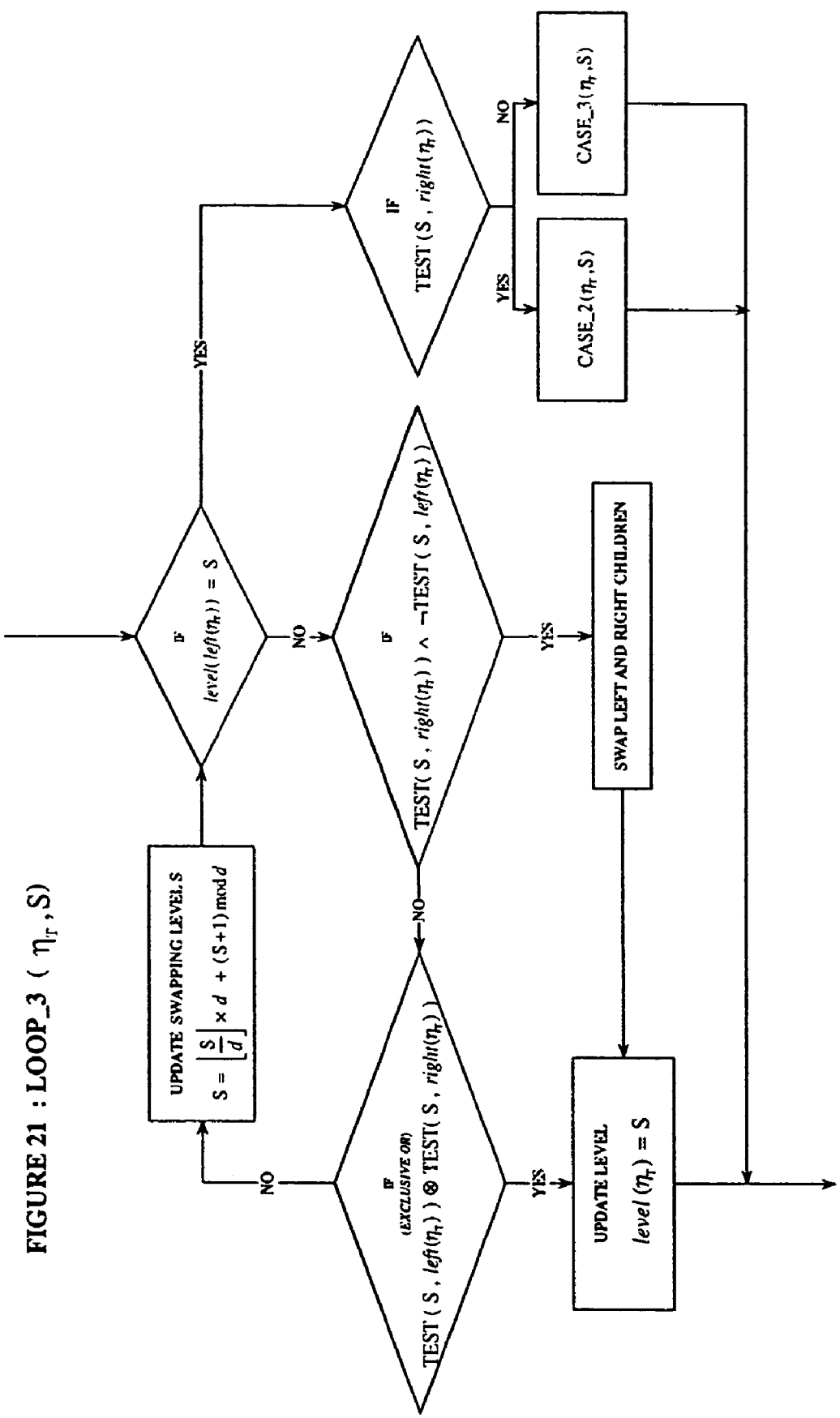
FIGURE 21 : LOOP_3 ($\eta_{\tau}$, S)

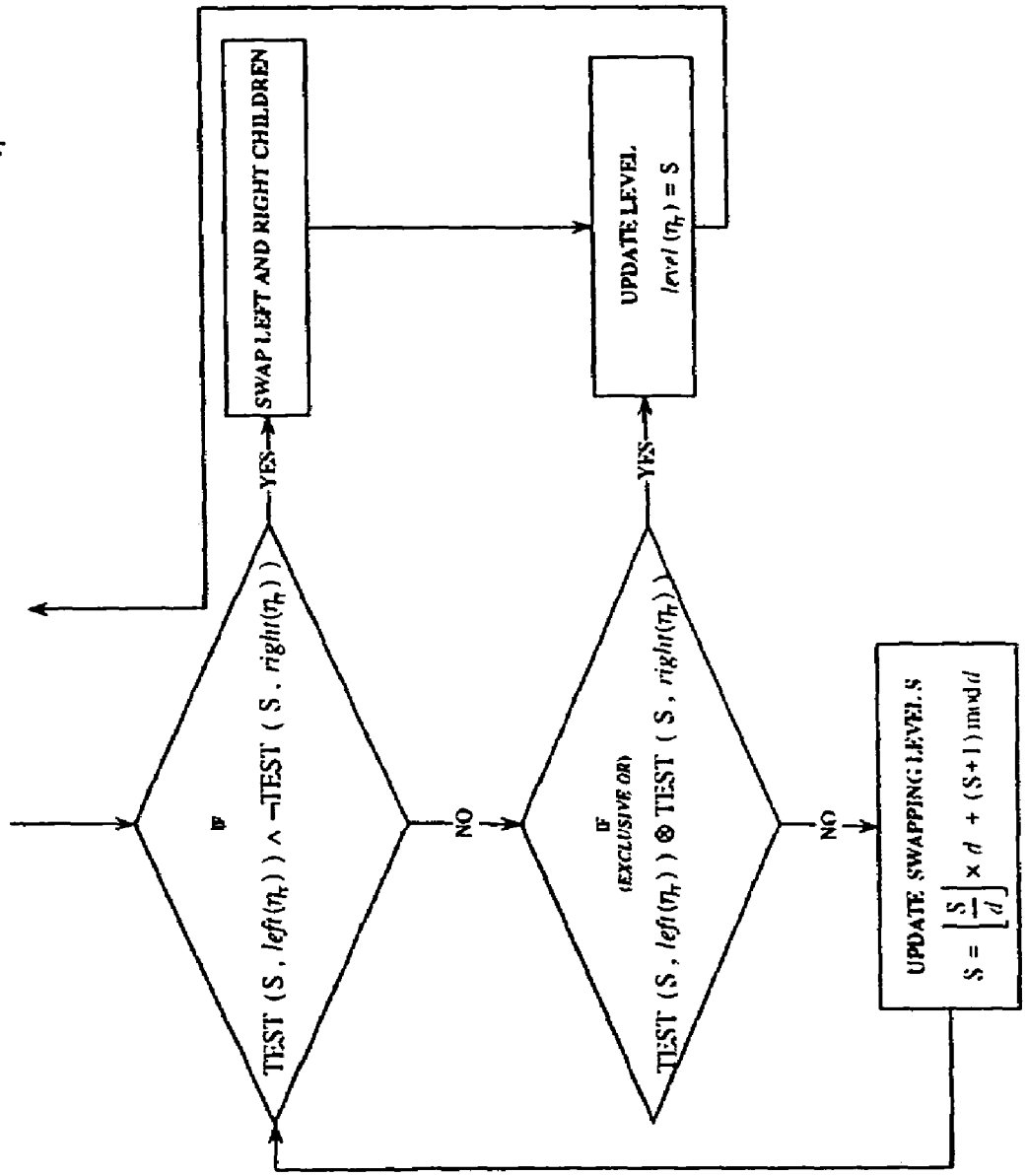
FIGURE 22 : LOOP_4 ( $\eta_T$ , S)

| CASE FIGURES | TRANSFORMATION DESCRIPTION |
|---|---|
| FIGURE 23: CASE_1 ( N,S ) |  |
| FIGURE 23: CASE_2 ( N,S ) |  |
| FIGURE 23: CASE_3 ( N,S ) | 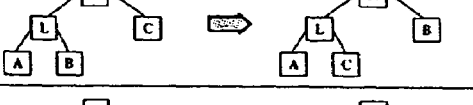 |
| FIGURE 23: CASE_4 ( N,S ) |  |
| FIGURE 23: CASE_5 ( N,S ) |  |
| FIGURE 23: CASE_6 ( N,S ) |  |
| FIGURE 23: CASE_7 ( N,S ) |  |
| FIGURE 23: CASE_8 ( N,S ) |  |
| FIGURE 23: CASE_9 ( N,S ) | 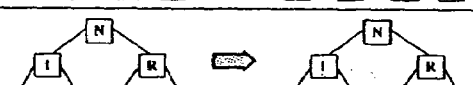 |
FIGURE 23A

FIGURE 23B

A ⟶ AFTER PERFORMING NECESSARY TREE STRUCTURAL CHANGES UPDATE LEVELS FOR THE FOLLOWING FIVE NODES.
FOR CLARITY *level* IS FURTHER LABELED WITH BEFORE AND AFTER ($level^{before}$ and $level^{after}$) WHICH CORRESPOND TO BEFORE AND AFTER TRANSFORMATION.

| NODE LABEL | BEFORE CASE TRANSFORMATION | AFTER CASE TRANSFORMATION |
|---|---|---|
| N | $level^{before}(N) = level(N)$ | $level^{after}(N) = S$ |
| L | $level^{before}(L) = S$ | $level^{after}(L) = level^{before}(N)$ |
| R | $level^{before}(R) = S$ | $level^{after}(R) = level^{before}(N)$ |
| l | $level^{before}(l) \neq S$ | $level^{after}(l) = level^{before}(N)$ |
| r | $level^{before}(r) \neq S$ | $level^{after}(r) = level^{before}(N)$ |

REFINING STOCHASTIC GRID FILTER

CROSS-REFERENCE TO RELATED APPLICATIONS

This application claims the benefit of U.S. Provisional Application No. 60/482,528, entitled "Refining stochastic grid filter," filed 25 Jun. 2003, wherein such document is incorporated herein by reference.

BACKGROUND OF THE INVENTION

The present invention relates to a method and a system for tracking and/or prediction of a nonlinear dynamic process (e.g., an incompletely modeled nonlinear dynamic process) in real time.

Many industries require a system to estimate the present and future state of a random dynamic signal, based upon corrupted, distorted, and possibly partial observations of the signal. For example, one may be interested in the real-time illumination of a stage performer based only on one-dimensional distance measurements produced by ultrasonic wave timings from perimeter speakers. Due to the inherent mechanical and physical time lags associated with robotic lighting, such applications require computer implementable tracking and prediction solutions to schedule lighting movements that are coordinated with where the performer will be some time in the future.

Furthermore, the one-dimensional acoustic observations are partial, are distorted by sampling, and are corrupted by the reflection of the ultrasonic waves off objects such as props on stage. While perfect determination of the signal's state is impossible under these circumstances, it is desirable to obtain probabilistic estimates of the current or future state, conditioned on the information that is available. More precisely, in one exemplary embodiment, the problem may be stated as follows.

The signal X to be tracked, possibly described by an Itô or Skorohod stochastic differential equation (SDE), is a Markov process defined on some probability space $(\Omega, F, P)$, and living within a bounded d-dimensional domain such as the rectangular domain $D=[0,L_0]\times[0,L_1]\times \ldots \times[0,L_{d-1}]$, where $L_i$, $0 \leq i \leq d-1$ are the lengths of all dimensions. In the case of the signal's dynamics being modeled by a time-homogeneous Itô SDE, X evolves according to $$dX_t = A(X_t)dt + B(X_t)dv_t,\qquad(1)$$

where $X_t$ is the signal state at time t and $v_t$ is a standard d-dimensional Brownian motion. A and B might have been chosen in a manner to ensure that $X_t$ stays in D. Otherwise, one can just track X until it leaves D or replace equation 1 with a Skorohod SDE that corresponds to 1 with boundary reflections. Let $a(x)=B(x)B^*(x)$ be the diffusion matrix with elements $\{a_{i,j}(x)\}$. The diffusion operator (L, D(L)) for the stochastic equation defined above is $$L = \frac{1}{2}\sum_{i,j=0}^{d-1} a_{i,j}(x)\frac{\partial^2}{\partial x_i \partial x_j} + \sum_{j=0}^{d-1} A_j(x)\frac{\partial}{\partial x_j}\qquad(2)$$

and the associated adjoint operator is given by $$L^* = \frac{1}{2}\sum_{i,j=0}^{d-1} a_{i,j}(x)\frac{\partial^2}{\partial x_i \partial x_j} + \sum_{j=0}^{d-1} \tau_j(x)\frac{\partial}{\partial x_j} + v(x)\qquad(3)$$

where $$\tau_j(x) = \sum_{i=0}^{d-1} \frac{\partial a_{i,j}(x)}{\partial x_i} - A_j(x) \text{ and } v(x) = \frac{1}{2}\sum_{i,j=0}^{d-1} \frac{\partial^2 a_{i,j}(x)}{\partial x_i \partial x_j} - \sum_{j=0}^{d-1} \frac{\partial A_j(x)}{\partial x_j}.$$

Let $\epsilon>0$ and set $t_m:=m\epsilon$ for $m=0,1,2,\ldots$. For some function H, the discrete sequence of observations $Y_{t_m}$ occurring at times $t_m$ for signal $X_{t_m}$ can be described stochastically by $$Y_{t_m} = H(X_{t_m}, W_{t_m}),\qquad(4)$$

where $W_{t_m}$ is a sequence of random variables that model the sensor noise input.

In the specific case for additive zero mean, $\sigma^2$ variance Gaussian noise, the above general equation (4) can be interpreted by $$Y_{t_m} = h(X_{t_m}) + \sigma \Delta W_{t_m},\qquad(5)$$

where h is taken to be the sensor function and $\Delta W_{t_m} = W_{t_m} - W_{t_{m-1}}$ may be the increment of a standard Brownian motion. We define $Y_t = \sigma\{Y_{t_m}, t_m \leq t\}$ to be the information observed up to time t.

The requirement is to construct a device which can efficiently approximate the conditional distribution of the state of the signal given all observations up to the current time, that is to estimate $$P(X_t \in A | Y_t).\qquad(6)$$

Such a device is generally known as an optimal tracking distribution, whose mean is the least squares estimate of the signal state $X_t$ given all the discrete observations up to time t. Also, the device should provide asymptotically optimal predictors to future signal states, computed through refining approximations to $$P(X_{t+\kappa} \in A | Y_t),\qquad(7)$$

which is the conditional probability of the signal state $X_{t+\kappa}$ at $\kappa>0$ time units into the future given the discrete observations up to time t.

"Use of Particle System Methods"

In the specific finite-dimensional Itô equation (1) with A affine and B constant and linear observations, an efficient, recursive, and optimal tracker is already known: the Kalman filter. Recursive, in this context, means that the computation involved in providing the state estimate after, say two observations, directly utilizes the result of the state estimate after the first observation while processing the newly arrived second observation. Not only does the Kalman filter have very stringent requirements on the possible signal dynamics and on the form of the observation noise, there are practical computational problems such as matrix instability and brittleness. In more general environments, which include the class of problems with non-linear signal dynamics and observation models with non-additive Gaussian noise (equation 4), the Kalman filter and its derivatives (e.g., an extended Kalman filter and an interacting multiple model tracker) are suboptimal. An interacting multiple model tracker runs multiple Kalman filters in banks, each making different assumptions on the signal dynamics, then weighting the multiple outputs to provide a tracking estimate.

In response to the shortcomings of the Kalman filter, other techniques have been developed and have expanded the class of solvable filtering problems. These techniques provide readily implementable computer algorithms that are efficient and provide asymptotically optimal solutions. For example, the class of nonlinear particle system methods is a recent approach used to solving filtering problems.

Particle approximations have the desirable feature of replacing storage of conditional distributions for the filtering equations with particle locations. Whereas it is difficult, or impossible, to store the densities for higher dimensional problems in a linear interpolative manner, it is relatively easy to store particle locations. Then, the empirical measures of properly designed interacting particle systems provide asymptotic approximations to the conditional densities of the filtering equations. Monte Carlo-type methods are used to propagate the particles instead of using infinite dimensional equation solvers. Hence, a great reduction in computational complexity can occur. The various particle methods perform quite differently under the realistic condition of a finite number of particles.

The basic requirements for a particle method are the simulation of independent samples of the signal, called particles, with the same stochastic law as the signal, and the re-sampling of these particles to incorporate observation information. In the case where the signal solves a stochastic differential equation, the simulation of each particle's SDE is usually implemented with discrete time Euler or Miltsein approximations. The set of particles are then adjusted in some manner to conform to each observation by either assigning each particle a scalar weight value, by interchanging the state values associated with each particle in some manner, or by cautious branching techniques, as described in U.S. Pat. No. 5,933,352 issued Aug. 3, 1999 to Salut, entitled "Method and a system for non-linear optimal estimation of dynamic processes in real time," and in the U.S. Patent Application Publication US2002/0198681 A1, published Dec. 26, 2002 to Kouritzin et al., entitled "Flexible efficient branching particle tracking algorithms."

One method described in U.S. Pat. No. 5,933,352 adjusts all N particles $\xi_t^j, j=0,1,2,\ldots,N-1$ to match all the observations up to time $t_m$ by calculating a scalar weight value $W_m$ for each particle and then modifying each particle's cumulative weight by the production $\tilde{W}_m = \tilde{W}_{m-m} \times W_m$. This method has two sub-methods. In one sub-method, the influence of past observations on the particle weights is attenuated in time, and in the other sub-method the influence of past observation on the weights is strictly limited in time. The conditional distribution approximations for particle $\xi^j$ with weight $\tilde{W}_m$ after the mth observation are $$P(X_{t_m} \in A \mid Y_{t_0}, Y_{t_1}, \ldots, Y_{t_m}) \approx \frac{1}{\sum_{j=0}^{N-1} \tilde{W}_m(\xi^j)} \sum_{j=0}^{N-1} \tilde{W}_m(\xi^j) 1_{\xi_{t_m}^j \in A}, \quad (8)$$

where N is the total number of particles at time $t_m$. The resulting weighted particle distribution can be made to converge to the optimal conditional distribution of the signal, given the observations, as the number of particles, N, is increased. The predicted distribution estimate for some future time $p > t_m$, conditioned on all the observations up to time $t_m$, is obtained by simulating the particles forward in time without any weight adjustments.

Another method described in U.S. Pat. No. 5,933,352 adjusts its particles $\xi_t^j, j=0,1,2,\ldots,N-1$ after each observation by redistributing some or all of their state data. This random redistribution through interacting particles is conducted such that particles with a higher weight are more likely to have their state data overwrite the state data of other particles with lower weight. In this manner, most particles are preferentially collected around the areas of the state space which have the highest conditional probability of containing the signal. While U.S. Pat. No. 5,933,352 does not specifically state this, it can be assumed that the intention is for all particles that are involved in this redistribution to have their weights set to the average of the weights of all involved particles after the redistribution is complete, since this is the condition which will retain the asymptotic optimality of the system.

As U.S. Pat. No. 5,933,352 states, simple particle weighting without redistribution causes degeneration in the output conditional distribution that can be rectified only to some degree by attenuating or limiting the effect of older observations. These actions themselves entail an unavoidable loss of asymptotic optimality in increasing numbers of particles for the filter. If only some particles are redistributed, there are still some degenerative effects working against optimality, and the calculation of the average weight for a subset of the particles is cumbersome. However, a great amount of computation is involved in redistributing all of the particle states at each time step. This effort is especially pronounced if the particle data must travel between processing units in a distributed architecture. Moreover, redistributing all of the particles induces undue extra randomness that impairs path space capabilities and downgrades performance.

Another particle filter was described in U.S. Patent Application Publication US2002/0198681 A1 to Kouritzin et al. This exemplary filter described therein may be referred to as the MITACS-PINTS Branching (MIBR) Particle Filter. The MIBR filter provides a more controlled method for resampling, which improves both performance and computer efficiency. Instead of moving the particles after each observation, the MIBR method probabilistically adjusts its particles $\xi_t^j, j=0,1,2,\ldots,N-1$ after each observation by selectively duplicating or removing the particles in accordance with a branching value criteria. Generically, most particles are neither duplicated nor removed but rather left alone after an observation. The branching value is similar to the particle weights in U.S. Pat. No. 5,933,352, but 1 is subtracted from $W_m$ in order to utilize the following routine:

1. If $W_m(\xi^j) \geq 0$, then the MIBR copies particle $\xi_j \lfloor W_m(\xi^j) \rfloor$ times. It will then add one more particle with probability $W_m(\xi^j) - \lfloor W_m(\xi^j) \rfloor$.
2. If $W_m(\xi^j) < 0$, then that particle is eliminated with probability $|W_m(\xi^j)|$.
3. Once this resampling has occurred, an efficient unbiased particle control routine is run to return the number of particles to the number of particles prior to resampling. After each resampling procedure, the weights of all particles are reset to a value of 1.

This MIBR method is advantageous over the two methods described in U.S. Pat. No. 5,933,352 by ensuring that, on average, the right amount of resampling takes place.

As with all the particle system methods mentioned above, the adjustments of particles due to newly arrived observations are treated individually, on a particle-by-particle basis.

A very different class of filters are characterized by signal space discretizations wherein particles are not independent copies of the signal, but rather represent a small mass of the conditional distribution. Furthermore, observation dependent treatments are not performed via particle-by-particle adjustments, but rather adjustments on a group of particles. Partial differential equations are commonly solved using this space discretization approach, such as finite element and multi-grid methods.

The discrete analog for a stochastic partial differential equation would be some Markov chain approximation. For filtering, there is a distinct choice: One can discretize the signal as described in Kushner, H. J., "A robust discrete state approximation to the optimal nonlinear filter for a diffusion," Stochastics, 3, pp.75–83 (1979), as well as in Di Masi, G. B. and Runggaldier, W. J., "Continuous-time approximations for the nonlinear filtering problem," Appl. Math. And Opt., 7, pp.233–245 (1981), or directly approximate the Duncan-Mortensen-Zakai (DMZ) and Fujisaki-Kallianpur-Kunita (FKK) equations. In the former case, robustness results can be used to ensure that the filtering solution with the approximate signal is not too different from the desired solution and any of the Kallianpur-Striebel formula, the Hidden Markov Model techniques, or the Gauge Transform methods can be used to calculate the approximate filter solution as described in Bhatt, A. G., Kallianpur, G., and Karandikar, R. L., "Robustness of the nonlinear filter," Stochastic Process. Appl., 81, pp.247–254 (1999).

SUMMARY OF THE INVENTION

A real-time method for use in estimating a conditional probability distribution of a current signal state and/or a future signal state for a non-linear random dynamic signal process is described according to one embodiment of the present invention. The method includes providing sensor measurement data associated with the non-linear random dynamic signal process. The sensor measurement data is dependent upon some component of a signal up to the current time. A filter is defined operating on the sensor measurement data by directly discretizing both amplitude and signal state domain for an unnormalized or normalized conditional distribution evolution equation. The discretization of the signal state domain results in creation of a grid including a plurality of cells and the discretization in amplitude results in a distribution of particles among the cells via a particle count for each cell.

In one embodiment of the method, method further includes evolving the filter distribution between a first instant of time, $t-\epsilon$, and a second instant in time, t. Evolving the filter distribution includes moving particles between cells and/or creating births and deaths of particles within cells at state dependent rates. Further, in one or more embodiments, evolving the filter distribution may includes differencing, for each cell, particle birth and death rates to provide a reduced number of birth and death events for the cell and/or differencing, for each cell, flow rates of particles in and out of a cell from flow rates in and out of neighboring cells to provide a reduced net flow of particles for the cell.

Yet further, in another embodiment, the rates for particle deaths within a cell and particle movement out of that cell are both subtracted from the sum of the rates of particle movement into the cell and particle births in the cell, creating a reduced combined net rate for each cell. The evolution of the filter distribution includes creating a reduced combined net rate for each of the cells.

In another embodiment of the method, the filter distribution is initialized with an initial count of particles and the filter distribution is evolved between a first instant of time, $t-\epsilon$, and a second instant in time, t. The method further includes controlling the total number of particles in the filter distribution while evolving the filter distribution to maintain the number of particles near a desired level.

In another embodiment of the method, evolving the filter distribution between a first instant of time, $t-\epsilon$, and a second instant in time, t, includes replacing 1-exponential times for simulation of events between the first instant of time and the second instant in time, as used in Markov chains, by the fixed value 1.

In yet a further embodiment of the method, a state of the filter distribution is stored as a tree including at least a plurality of leaf nodes. The tree is representative of a subset of cells along with associated rate information and particle count information for each cell. Each leaf node corresponds to one of the plurality of cells that contain particles (e.g., the tree may store leaf nodes indexed by a dimensionally interleaved binary expansion (DIBE) index).

In one or more embodiment relating to the state of the filter distribution being stored as a tree, the method may include dynamically removing a leaf node corresponding to a cell when that cell has an associated particle count that falls below a predetermined limit; dynamically adding a leaf node corresponding to a cell when that cell would have, via one or more particle birth events, an associated particle count that rises above a predetermined limit; and/or dynamically refining the grid to split one or more of the plurality of cells into neighboring cells and/or merging the grid to combine neighboring cells into a single cell.

Further, for example, when dynamically refining the grid, the method may include recursive duplication of cloned versions of all tree nodes and leaf nodes of the tree for use when cells represented by the leaf nodes split and/or recursive folding of right and left sub-trees of tree nodes and leaf nodes of the tree for use when cells represented by the leaf nodes merge. Yet further, dynamically refining the grid may include reordering the tree, to maintain proper DIBE indexing throughout the tree, before splitting and/or merging one or more cells without tree reconstruction.

In yet another embodiment of the method, one or more non-leaf nodes of the tree may include at least one of sum of rate information, imaginary observation time information, and particle count information.

Yet further, in another embodiment of the method, the filter distribution is initialized with an initial count of particles, and the method further includes controlling the total number of particles in the filter distribution to maintain the number of particles near a predetermined level with use of a tree push down technique of birth and death events.

In yet another embodiment of the method according to the present invention, evolving the filter distribution includes updating the filter distribution as a function of sensor measurement data on a cell by cell basis.

In still yet another embodiment of the method according to the present invention, the method includes computing estimates of the conditional probability distribution based upon the filter distribution.

Yet further, another embodiment of the method may include providing multiple grids for use in comparing validity of and/or selection between various signal and observation models.

In addition, according to yet another embodiment of the method, the grid functions in a space of counting measures so as to permit tracking of an arbitrary unknown number of targets.

Further, systems according to present invention may be used to implement one or more functions described above or elsewhere herein. For example, a computer system employing one or more processors (e.g., a parallel processor architecture) may be used. Further, the present invention provides a computer readable medium including a program operable in conjunction with one or more processors of a computer system to implement the filter for use in estimating a conditional probability distribution of a current signal state and/or a future signal state for a non-linear random dynamic process as described herein.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF FIGURES

The notation used to describe data structure objects is an object-oriented format. A data structure object type will be labeled by a symbol, where a symbol is either one or more italicized letters of the English or Greek alphabet. For the ease of recognition and meaning, these symbols may be denoted as underscored or italicized words. These data structure objects may have data member fields which are either references to instances of other object types, a single numerical value, or an array of numerical values. A particular field for an object will be labeled by a symbol followed by either a single or double element list enclosed in round brackets. For both a single and double element list, the first element will denote the data structure object that the member data field belongs to, whereas for double element lists, the second element will indicate an array index.

The figures are labeled by number, name and a comma separated argument list. The name for a figure will be an underscore separated description, and for the ease of recognition and meaning a figure's name will only contain capitalized letters from the English alphabet. Every figure, with the exception of the first, describes the details to a method or procedure on data structure object type(s). These data structures are noted as arguments to the procedure and are labeled as a list enclosed in round brackets appended after the figure's name.

Most figures are illustrated as flow-charts, with diamond shaped boxes denoting a flow split in accordance to some yes-no condition, and rectangular boxes denoting a procedure or a call to another figure (or even the same figure in the case for recursive procedures), passing along the appropriate arguments. For simplicity purposes and clarity, some procedures in figures have transformation drawings to illustrate tree data structural changes. Also, double yes-no decisions are put into a shaded box to represent the four different resulting permutations of the two binary conditions.

FIG. 1: REST_FILTERING_PROCEDURE—shows one exemplary embodiment of a Refining Stochastic Grid Filter's filtering procedure according to the present invention as may be implanted by a processor based system. After initialization, the procedure evolves clockwise around the oval with an application-dependent starting point.

FIGS. 2A–2B: INITIALIZE_DATA_STRUCTURE(F)—shows one exemplary embodiment of a description for the three data structure objects, namely the REST filter device labeled F, a cell node labeled $\eta_C$ and a tree node $\eta_T$. This procedure is called during REST_FILTERING_PROCEDURE.

FIG. 3: EVOLVE_DISTRIBUTION(F,$\epsilon$)—shows one exemplary embodiment of a procedure for evolving REST's distribution $\epsilon$ time units forward. This procedure is called during REST_FILTERING_PROCEDURE.

FIG. 4: PUSH_DOWN_EVENTS_TREE($\eta_T$,event_count)—shows one exemplary embodiment of a recursive procedure for pushing down event_count number of quantized units of events. This procedure is called during EVOLVE_DISTRIBUTION(F,$\epsilon$).

Figure 5B:
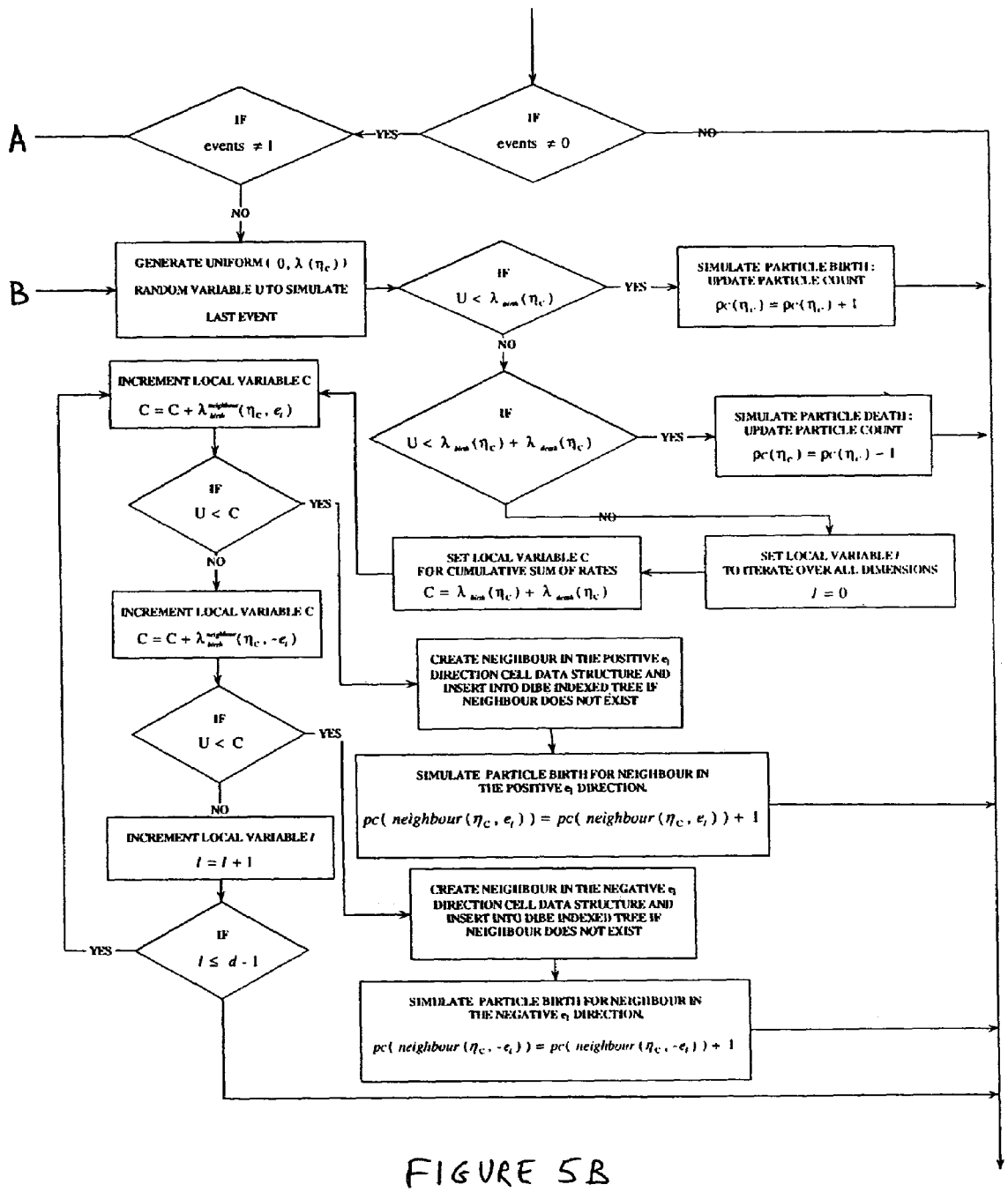

FIGS. 5A–5B: PUSH_DOWN_EVENTS_CELL($\eta_C$, event_count)—shows one exemplary embodiment of a procedure for simulating event_count number of quantized units of events at the leaf cell node level. This procedure is called during PUSH_DOWN_EVENTS_TREE($\eta_T$,event_count).

FIG. 6: RESAMPLE_DISTRIBUTION (F,$Y_{t_m}$)—shows one exemplary embodiment of a procedure for proper resampling of REST's distribution. This procedure is called during REST_FILTERING_PROCEDURE.

FIG. 7: PUSH_DOWN_TIMES_TREE($\eta_T$,times)—shows one exemplary embodiment of a recursive procedure for pushing down "times" number of quantized units of imaginary observation times. This procedure is called during RESAMPLE_DISTRIBUTION (F,$Y_{t_m}$).

FIG. 8: PUSH_DOWN_TIMES_CELL($\eta_C$,times)—shows one exemplary embodiment of a procedure for the adjustments of particle counts in cells. This procedure is called during PUSH_DOWN_TIMES_TREE($\eta_T$,times).

FIG. 9: PUSH_DOWN_PARTICLE_CONTROL_TREE ($\eta_T$, particles)—shows one exemplary embodiment of a recursive procedure for the push down of "particles" number of quantized units of control particles. This procedure is called during REST_FILTERING_PROCEDURE.

FIG. 10: PUSH_DOWN_PARTICLE_CONTROL_CELL($\eta_C$, particles)—shows one exemplary embodiment of a procedure for the particle adjustment due to particle control at the leaf cell node level. This procedure is called during PUSH_DOWN_PARTICLE_CONTROL_TREE($\eta_T$, particles ).

FIG. 11: PRUNE_TREE($\eta_T$)—shows one exemplary embodiment of a recursive procedure for the removal of zero particle leaf cells. This procedure is called during REST_FILTERING_PROCEDURE, FILTER_SPLIT(F,split_index), and FILTER_MERGE(F,merge_index).

FIG. 12: PRUNE_CELL($\eta_C$)—shows one exemplary embodiment of a procedure for removing zero particle cell at the leaf node level. This procedure is called during PRUNE_TREE($\eta_T$).

Figure 13B:
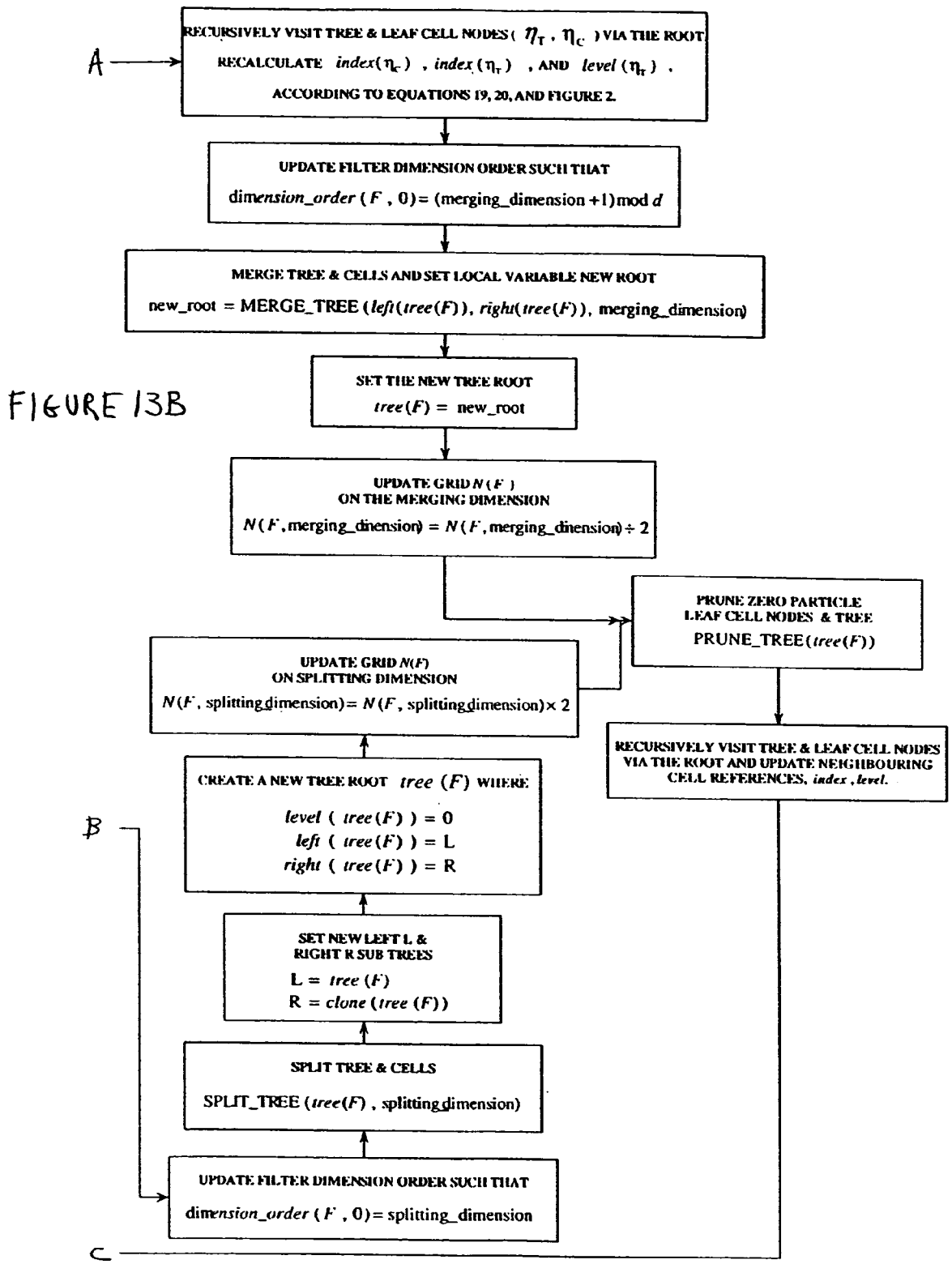

FIGS. 13A–13B: SPLIT_OR_MERGE(F)—shows one exemplary embodiment of a procedure for resizing the REST filter's grid N(F) (i.e., reducing or increasing its mesh size in one dimension). This procedure is called during REST_FILTERING_PROCEDURE.

FIGS. 14A–14B: MERGE_TREE($\eta_T$,mirror,merge_index)—shows one exemplary embodiment of a recursive procedure for merging the tree and cell nodes. This procedure is called during SPLIT_OR_MERGE(F).

FIG. 15: MERGE_CELL($\eta_C$,mirror,merge_index)—shows one exemplary embodiment of a procedure for merging a leaf cell node with its neighbour (mirror), and pooling their particles to the newly created cell. This procedure is called during MERGE_TREE($\eta_T$,merge_index).

FIG. 16: SPLIT_TREE($\eta_T$,split_index)—shows one exemplary embodiment of a recursive procedure for duplicating the tree and cell nodes. This procedure is called during SPLIT_OR_MERGE(F).

FIG. 17: SPLIT_CELL($\eta_C$,split_index)—shows one exemplary embodiment of a procedure for splitting a leaf cell node, and distributing the particles. This procedure is called during SPLIT_TREE($\eta_T$,split_index).

Figure 18B:
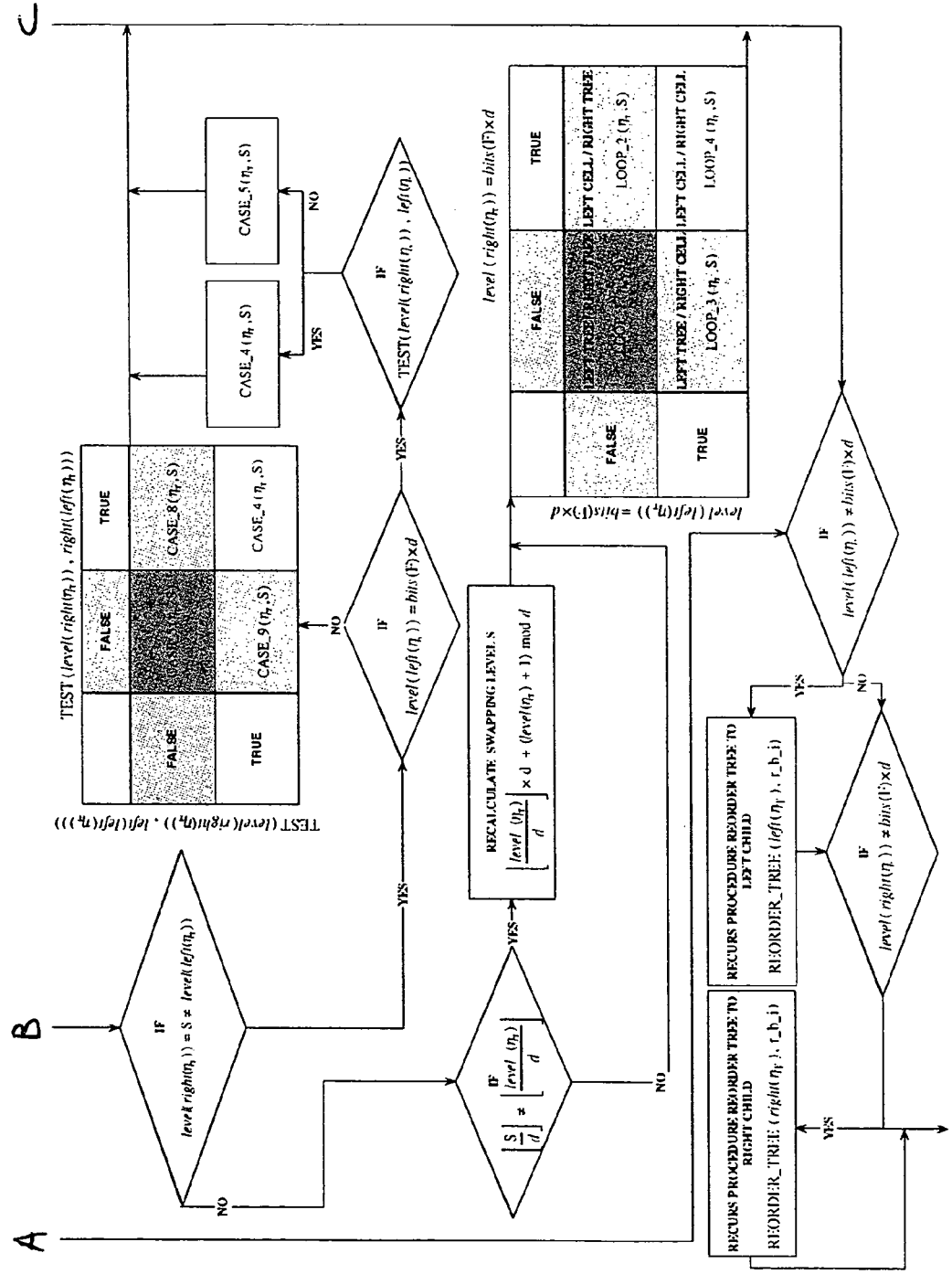

FIGS. 18A–18B: REORDER_TREE($\eta_T$,r_b_i)—shows one exemplary embodiment of a recursive procedure for reordering the tree structure. This procedure is called during SPLIT_OR_MERGE(F).

FIGS. 19–22: LOOP_1($\eta_T$,S) through LOOP_4($\eta_T$,S)—shows one exemplary embodiment of a series of tests to classify $\eta_T$ into one of nine cases (FIGS. 23 to 31). This procedure is called during REORDER_TREE($\eta_T$,r_b_i).

FIGS. 23A–23B: FIG. 23 CASE_1(N,S) through FIG. 23 CASE_9(N,S)—shows one exemplary embodiment of a procedure for restructuring the DIBE indexed tree. This procedure is called during REORDER_TREE($\eta_T$,r_b_i) and LOOP_1($\eta_T$,S) to LOOP_4($\eta_T$,S).

DETAILED DESCRIPTION OF THE EMBODIMENTS

One or more embodiments of the present invention shall be described with reference to the generalized exemplary procedure shown in FIG. 1. In addition, various embodiments of the procedure shall be described with reference to the FIGS. 2–23.

Generally, the present invention, at least in one embodiment, is a direct space discretization approach that is related to particle system methods. One embodiment of the present invention efficiently approximates the conditional distribution of the signal's state via discrete space and amplitude approximations. For each observation realization, the approximations are not Markov chains but rather exhibit far less noise. Randomness is only introduced sparingly to maintain a particle representation.

The implemented filter according to one embodiment of the present invention accepts a sequence of measurements from sensors, each of which contain noisy, corrupted, and distorted information about the position of the signal (e.g., contains measurement noise). The filter adjusts particle counts in cells such that they conform to these measurements, and then uses these cells with their particle counts to provide detection, tracking, and predictions via approximate conditional distributions of the signal state. These distributions may be used to provide a human display interface or to control automated systems.

The present invention pertains to mathematical methods and computer implementation for efficient real-time tracking and prediction of random nonlinear dynamic processes. The mathematical method, at least in one embodiment, is a direct discrete-space approximation to the optimal filter (equation 6); whereas, the computer implementation entails both the data structures and the procedures on these data structures for implementing the approximation efficiently.

In one embodiment, the filter device utilizes the unnormalized conditional distributional solution to the filtering problem in terms of a continuous-time or discrete-time version of the Duncan-Mortensen-Zakai equation, and then uses discrete-space and amplitude approximations to produce implementable approximate solutions. The later approximations incorporate the discretizations of both space and amplitude directly to the unnormalized conditional distribution of the signal given the back observations. The discretization of amplitude results in particles representing a small mass of the conditional distribution at particular grid points of a grid in the signal domain. These grid points correspond to the discrete-space approximation. Particles are usually assumed to be uniformly distributed over the area around a particular grid point; this region defines a "cell" object. It will be apparent that the present invention would also be applicable to a normalized conditional distribution evolution equation.

In particular, according to one embodiment of the present invention, particles do not evolve independently of one another like those of continuous-state particle filters. Rather, net flow calculations, involving all particles, are utilized. Here, the birth and death of particles within a cell's region is governed by observation-and-signal-law-dependent time calculations.

In order to make the method according to one embodiment of the present invention efficient, these time calculations are reduced to a single birth or death rate for each cell which combines particle deaths, births, and migrations. As a result, a particular cell's rate depends on particle counts of its neighbouring cells. In many applications, like when the signal includes multiple interacting targets or some counting measure-valued process, some regrouping must be done to determine a cell's neighbours.

The space and amplitude discretization approximations according to one embodiment of the present invention converge to the actual filtering conditional distribution (equation 6) as the number of particles increases and cell size decreases. This discrete-space-amplitude method and implementation may be referred to herein as the Refining Stochastic Grid Filtering or REST method. The REST method may include one or more of the following features for stochastic filtering solutions:

Implementation by direct discretization in both amplitude and space of the unnormalized conditional distribution. For example, the implementation may include evolution of approximate conditional distribution through particle births and deaths in cells. Other methods approximate the signal and/or observation, while REST directly approximates the unnormalized filtering equation. Other particle methods introduce error in simulating the signal's SDE by Euler or Miltsein approximations, while REST can evolve its distribution in continuous time. Other particle methods inefficiently resample their distribution through individual particle-by-particle treatment, while REST's discrete-space representation groups nearby particles into cells; therefore, observation-dependent resampling is performed faster and with less resampling noise.

Removal of randomness and faster computation times is accomplished as compared to classical implementation of Markov chain approximations to parabolic equations and stochastic partial differential equations. Classical Markov chain approximations compute the bi-directional particle movement rates, whereas REST considers the difference of these rates to yield a less random, and computationally faster net uni-directional movement rate between two neighbouring cells. Furthermore REST differences all rates, including drifts, diffusions, births, and deaths, incorporating both signal diffusion and observations to consider the total net-flow of particles via births and deaths only. Whereas Markov chain approximations would use 1-exponential times for simulation of events, REST removes randomness by replacing the use of 1-exponential times (as used in Markov chain approximations with the fixed value 1. Further, by considering all particles in a cell together, differencing rates, and avoiding Monte Carlo simulations, REST has far less simulation noise than other particle systems and, thereby, can provide similar accuracy with far fewer particles. In addition, REST can group and concurrently handle a number of simulation events. Whereas simultaneous simulation of multiple events results in a more efficient distribution and execution stages, smaller numbers of simultaneous events yield more exact solutions, with simulating one event being the most precise.

The Dimensionally Interleaved Binary Expansion (DIBE) indexed binary tree structure and the methods used therewith according to one embodiment of the present invention provides certain functionality and/or one or more advantages. For example, storage and placement of particle occupied cells are implemented, at least in one embodiment using the DIBE indexed binary tree. Further, for example, using the tree, removal of cells with zero particles reduces the number of cells to consider without loss in fidelity of estimates. Further, an efficient log(n) computation time complexity, where n is the number of active cells (cells with non-zero particle counts), for the simulation of a particle birth or death in a cell via summing cumulative rates in tree nodes and applying a novel "push down technique" can be implemented. In addition, keeping the DIBE tree relatively balanced when pruning zero particle cells by the nature of the DIBE index, uniformly reduces the tree's height.

A dynamic refining grid according to one embodiment of the present invention can be used to split or merge all cells into and/or with neighbouring cells in a particular dimension. In combination with the removal of cells with zero particles from the tree, the refining grid feature allows for a regular computation time via the regulation of the number of cells in consideration, while having the fidelity of finer grids (e.g., smaller cells). Further, parameter estimation can be automatically done by including parameters as extra signal dimensions. The add infinitum splitting in these dimensions will then resolve these parameter values. In addition, an efficient procedure for reordering the tree and DIBE index used before splitting and/or merging cells may be implemented. Reordering the tree changes the tree structure to accommodate for a new interleaving of dimensions in the DIBE indexing mechanism when the REST refines on a particular dimension.

Efficient Particle Control can be implemented in one or more embodiments of the present invention. For example, when simultaneously simulating multiple events, particle control may be needed during the evolve distribution stage. REST implements this particle control by the push-down-technique mentioned above, e.g., via the cumulative sums of rates. Yet further, an efficient particle control may be implemented via the summing of cumulative particle counts in tree nodes and applying the push-down-technique.

In accordance with the data structures, systems, readable medium, and methods of the invention, Refining Grid Stochastic (REST) filter (F) and implementation 10 (at least according to one embodiment) is shown in FIG. 1. Generally, the filtering procedure 10 includes creating a filter structure and initialization of the filter 12 (e.g., creating a grid of cells with a distribution of particles among the cells via a particle count for each cell). For example, the distribution is stored as a tree including at least a plurality of leaf nodes. The tree is representative of a subset of cells along with associated rate information and particle count information for each cell. Each leaf node corresponds to one of the plurality of cells that contain particles.

The filter procedure 10 provides for the receipt and recognition of an observation $Y_{t_m}$ for time $t_m$, as shown in block 14. The filter distribution is resampled according to the observation received (block 16) to update the filter distribution. Further, an approximate conditional distribution is provided for time $t_m$ (block 18) for use in providing tracking and prediction.

Particle control is performed on the filter distribution (block 20) via, for example, a push down technique. The filter distribution stored as a tree may be pruned of cells with zero particles (block 22). Further, the grid of cells may be refined by splitting and/or merging (block 24). The distribution is evolved forward $\epsilon$ time units (block 26).

The present invention and/or one or more portions thereof may be implemented in hardware or software, or a combination of both. For example, the functions described herein may be designed in conformance with the principles set forth herein and implemented as one or more integrated circuits using a suitable processing technology, e.g., CMOS.

As another example, the present invention may be implemented using one or more computer programs executing on programmable computers, such as computers that include, for example, processing capabilities, data storage (e.g., volatile and nonvolatile memory and/or storage elements), input devices, and output devices. Program code and/or logic described herein is applied to input data to perform functionality described herein and generate desired output information. The output information may be applied as an input to one or more other devices and/or processes, in a known fashion.

Any program used to implement the present invention may be provided in a high level procedural and/or object orientated programming language to communicate with a computer system. Further, programs may be implemented in assembly or machine language. In any case, the language may be a compiled or interpreted language.

Any such computer programs may preferably be stored on a storage media or device (e.g., ROM or magnetic disk) readable by a general or special purpose program, computer, or a processor apparatus (e.g., one or more processors configured in any known architecture) for configuring and operating the computer when the storage media or device is read by the computer to perform the procedures described herein. The system may also be considered to be implemented as a computer readable storage medium, configured with a computer program, where the storage medium so configured causes the computer to operate in a specific and predefined manner to perform functions described herein.

In view of the above, it will be readily apparent that the functionality as described herein may be implemented in any manner as would be known to one skilled in the art.

REST's two basic filtering procedures involve the evolution of its conditional distribution in real time and a proper resampling procedure of the distribution following the reception of a newly arrived observation $Y_{t_m}$ information. To explain REST's operation, first data structures used to store the filter's state are presented. Then, the algorithm for evolution between observations for both time-homogenous and time-inhomogeneous signal models is described, followed by the update procedure for when an observation is received. Finally, the data structure adaptation and maintenance techniques are provided that keep the computations efficient and consistent.

"REST'S Data Structures: Discretizing the Signal State Space"

The primary object pertaining to the filter procedure of the present invention is the Refining Stochastic Grid Filter object and is denoted by the symbol F. The filter's discrete space representation of the signal state space is defined by a grid via a vector of integers N(F) or N(F,i), i=0,1,2, . . . , d−1. Filter F partitions the signal domain D by N(F) into a collection of d-dimensional cells of size $$\frac{L_0 \times L_1 \times \cdots \times L_{d-1}}{N(F, 0) \times N(F, 1) \times \cdots \times N(F, d-1)}.$$

Letting a vector of integers coords($\eta_C$,i), i=0,1,2, . . . , d−1 represent cell $\eta_C$'s grid point position, the following sub-domain for cell $\eta_C$ can be defined by $$I(\eta_C) := \left[\frac{\text{coords}(\eta_C, 0) \times L_0}{N(F, 0)}, \frac{(\text{coords}(\eta_C, 0)+1) \times L_0}{N(F, 0)}\right] \times \qquad (9)$$
$$\left[\frac{\text{coords}(\eta_C, 1) \times L_1}{N(F, 1)}, \frac{(\text{coords}(\eta_C, 1)+1) \times L_1}{N(F, 1)}\right] \times$$
$$\vdots$$
$$\left[\frac{\text{coords}(\eta_C, d-1) \times L_{d-1}}{N(F, d-1)}, \frac{(\text{coords}(\eta_C, d-1)+1) \times L_{d-1}}{N(F, d-1)}\right]$$

where $L_i$, $0 \leq i \leq d-1$ are the lengths for all dimensions.

Each cell $\eta_C$ is indexed and stored as a leaf node of an indexed binary tree as described in the "A Balanced Tree: The DIBE Index" section herein, for which the filter object F stores a reference of the root node, denoted tree(F). Given an index index($\eta_C$), the filter can traverse from root to leaf by recursively visiting either the left or right sub-tree to locate the desired cell $\eta_C$. The symbol $\eta_C$ is used to denote a leaf cell node, and the symbol $\eta_T$ is used to denote a tree node; both are considered to be arbitrary nodes. The decision at a particular tree node $\eta_T$ on locating a particular leaf cell node $\eta_C$ is based on testing whether or not a binary digit i is set to 1 in index($\eta_C$);

$$\text{TEST}(i, \eta_C) = 2^i \ \& \ \text{index}(\eta_C), \qquad (10)$$

where & is the bitwise "and" operator for two integers. If TEST(i, $\eta_C$)=1, the ith binary digit for index($\eta_C$) is set, and the procedure recurses to the right child node right($\eta_T$), otherwise the procedure recurses to the left child node left($\eta_T$). In the interest of locating a leaf cell node, the above test would be written as TEST(level($\eta_T$),$\eta_C$) where level ($\eta_T$) is the depth of the tree node $\eta_T$ in a full tree. This storage for level($\eta_T$) is necessary when the binary tree is not full which is discussed in the section entitled "The Refining Grid: Splitting and Merging Cells" herein. Note that right ($\eta_T$) and left($\eta_T$) do not necessarily need to be other tree nodes but may also be leaf cell nodes.

The REST filter's data structure F and its sub-components (cell node $\eta_C$ and tree node $\eta_T$) are described by the three tables in FIGS. 2A–2B. The descriptions of cell and tree nodes are recursive, thus the construction of tree(F) may be performed recursively through the parent, left, and right sub-tree references according to the equation 10 and the description above. The left column of a table in FIG. 2 denotes the symbol and the middle column corresponds to a description for the particular data field. For simplicity, the procedure for construction of the data structures and appropriate initializations thereof is not described in any further detail herein.

A cell $\eta_C$ contains particles which represent a small mass of the conditional distribution at the particular cell's grid point, represented by the cells coordinate coords($\eta_C$). Particle counts pc($\eta_C$), along with various other cell node member data, are summed and stored recursively at each tree node. For example, the total sums for particle counts is recursively defined at each tree node $\eta_T$ by $$pc(\eta_T) = pc(\text{right}(\eta_t)) + pc(\text{left}(\eta_T)) \qquad (11)$$

To obtain the approximate conditional probability of the signal being in cell $\eta_C$, we divide pc($\eta_C$) by the filter's total summed particle count, found at the root tree node pc(tree (F)). Consequently, the description of the stochastic particle model can be given by the conditional density function $$\hat{p}(x) \approx \sum_{\eta_C \in \text{live\_cells}(F)} \frac{pc(\eta_C)}{pc(\text{tree}(F))} 1_{\eta_C}(x), \qquad (12)$$

where $1_{\eta_C}(\cdot)$ denotes the indicator function on $1(\eta_C)$ and live_cells(F) is the set of all cells currently in the tree.

"Measure Valued Signal Space"

The previous section describes the case where the signal space the REST filter operates in is the same as the space the target exists in. This target space filtering is appropriate for many problems. However, there is a large class of problems, such as multi-target tracking problems, for which it is insufficient. In cases such as these, the REST filter can operate in a space of measures, treating the signal that the filter tracks as a measure-valued process. In the case of a multi-target tracking problem, where the number of targets is unknown, the signal is typically a counting measure of the number of targets in the domain, defined as:

$$X_t = \sum_{j=1}^{M_t^X} \delta_{X_t^j} \qquad (13)$$

where $\delta$ is the Dirac delta measure, $M_t^X$ is the unknown number of targets in the signal, and $X_t^j$ is the state of the jth target.

To implement the REST filter for a counting measure valued process, the space must be discretized as described herein (e.g., in the previous section); however, such discretization is performed in a slightly different way. Instead of directly discretizing the measure, the measure is applied to a measurable space that is already discretized. In other words, for example, the target space is first discretized exactly as in the non-measure case above; however, the cells obtained are not used directly for filtering, and will be referred to as "blocks" instead of as cells.

Each filter cell represents a counting measure on the discretized measure space defined by this collection of blocks. Thus, each cell specifies a possible state for each target in the domain. These states are indicated by the Dirac delta measure in some block which represents a complete target state. In the event that the cell represents a situation in which two targets have the same state (according to the discretization), the counting measure will be the sum of two Dirac delta measures in the appropriate block.

The use of a measure-valued process for the signal adds one additional complication to the implementation of the filter. The evolution of particle counts depends on a concept of "neighbours" for cells. Two cells are neighbours if there may be particle flow between them with no intermediary. To control particle flow, a neighbour relationship is defined between cells. In the non-measure case, two cells are considered neighbours of each other if and only if they are adjacent in target space. However, in the case of measure-valued processes, the neighbour relationship is more complex (e.g., the relationship may be problem dependent). For example, in the case of a multi-target tracking problem using a counting measure valued signal process, a cell's neighbours are generally defined as follows: two cells are neighbours if and only if the states of all but one of the targets is identical between the cells and the state of the final target differs in only one dimension and by only one discrete unit. To clarify, neighbour cells are found by moving one target one unit in any state dimension.

Using similar methods, REST can also be applied to marked point processes, such as marked point Poisson processes, where the signal measure represents the process' count for each block. In this case, a neighbour is found by incrementing or decrementing the count in a single block.

In summary, the REST filter can operate using a measure valued signal process. This flexibility allows the filter to be applied to special sorts of problems, including multi-target tracking problems and marked point processes. In both cases, counting measures are used. The counting measures allow each cell to specify the state of an arbitrary number of targets.

"A Balanced Tree: The DIBE Index"

To minimize the cost of the tree traversal procedures when zero particle leaf cells have been pruned (pruned as, for example, described in the section entitled "Pruning tree: Dynamic Cell Removal/Creation" herein), the REST filter must ensure the binary tree remains relatively balanced. In the worst case, a degenerate tree could result in zero particle leaf cell node removals having no effect on the computational complexity of the traversal routines. Without any procedural overhead that comes with extra tree-balancing solutions found in database tree-balancing algorithms, the REST filter assigns a unique index to every cell in a manner that ensures that cells which are close spatially will be distant in the tree. This determines the binary tree structure and keeps the tree relatively balanced except in highly unusual situations.

A DIBE index is assigned to every cell and is determined from the cell's grid point location on the discretized state space, $l(\eta_C)$. As mentioned previously herein, the DIBE index for cell $\eta_C$, index($\eta_C$), determines the placement of cell $\eta_C$ in the DIBE indexed binary tree, and therefore is used as a indexed storage mechanism with O(log(n)) searching complexity. By dimensionally interleaving on the binary expansions for cell coordinates, the resulting DIBE index places all cells and their neighbours on the leaf node level at maximum distances from each other.

Let $b^i:=\text{coords}(\eta_C,i)$, $i=0,1,2,\ldots,d-1$ be the integer value grid point coordinate in the $e_i$ direction for cell $\eta_C$, and $b_j^i$, $j=0,1,2,\ldots$, bits(F) be the jth binary digit for the binary expansion of $b^i$ where bits(F) is the maximum number of bits needed to represent the largest grid partition $$\text{bits}(F) = \log_2(\max N(F,i), 0 \le i \le d-1). \quad (14)$$

The DIBE index for cell $\eta_C$ is defined by dimensionally interleaving the sequence of binary digits as such $$\text{index}(\eta_C) = b_{\text{bits}(F)}^{\alpha(d-1)} \ldots b_{\text{bits}(F)}^{\alpha(d-1)} b_{\text{bits}(F)}^{\alpha(0)} \ldots \quad (15)$$
$$b_1^{\alpha(d-1)} \ldots b_1^{\alpha(1)} b_1^{\alpha(0)} \ldots b_0^{\alpha(d-1)} \ldots b_0^{\alpha(1)} b_0^{\alpha(0)},$$

where $\alpha(l) = (l+\text{dimension\_order}(F,0)) \mod d$, $0 \le l \le d-1$. dimension\_order(F) is the ordered sequence of dimensions in which the DIBE index is calculated. This in turn governs the structure of the DIBE indexed tree which leads to fast grid splitting and merging algorithms as described herein, such as, for example, discussed in the section entitled "The reefing Grid: Splitting and Merging Cells."

In the measure-valued process case, this form of index cannot be applied, so an alternate index is used. However, for simplicity, because the appropriate index is highly problem dependent, no further description shall be provided for the measure-valued process case.

The DIBE indexing mechanism avoids resorting to check and re-structure the tree to keep it balanced. Other indexing algorithms, such as using the sum of the coordinates in each dimension as a replacement for one of the dimensions coordinate, can result in a more balanced tree in certain cases.

"Initializing REST's Distribution"

When the REST filter is first initialized (block 12), prior to any information being received by the filter, an initial distribution is used to allocate particles to cells. If the initial distribution of the signal is known, REST's initial distribution is set to be an approximation of this known signal. Otherwise, a uniform distribution over REST's cells is used.

"Evolving REST's Distribution Between Observations"

Unlike recently used particle system methods, the REST filter does not evolve its distribution by independent particle simulations that approximate the signal's SDE. Instead, REST adjusts particle counts in cells to mimic particle births, deaths, drift and diffusions according to signal dynamics. FIGS. 3, 4, and 5A–5B describe the procedure for evolving REST's distribution (e.g., block 26).

This method for evolution assumes a time-homogenous, continuous time signal model. Other types of signals can be handled using imaginary times, as described herein, for example, as discussed in the section entitled "Distribution Evolution: The Other Case."

The evolution (block 26) as shown in FIGS. 3–5 is composed of a series of "events," each of which represents a birth or death in a single cell. To evolve the filter's distribution by ∈ time units forward, the REST filter computes the amount of time represented by a single event based on a total summed rate found in λ(tree(F)). An event is randomly selected via the indexed binary tree and is simulated by cell particle count adjustments. When the procedure starts, a counter is initialized to S=0.0. S is incremented by the amount of time a simulated event represents. This procedure is repeated until such time that the incrementing simulated time S is equal to ∈.

In similar Markov chain approximations, the amount of time an event represents is calculated by generating a 1-exponential random variable and then dividing it by λ(tree(F)). The REST filter removes the simulation randomness by replacing the 1-exponential random variable by the constant value 1.

The REST filter uses an indexed binary tree to recursively select a random "target" cell node with probability based on the cell's total rate $\lambda(\eta_C)$. $\lambda(\eta_C)$ is the total sum of different individual rates that depend on the adjoint operator which describes the signal's distribution evolution, the cell's particle count $pc(\eta_C)$, and the particle counts of neighbouring cells in both positive and negative directions for all d dimensions $pc(neighbour(\eta_C, \pm e_i))$, $i=0,1, \ldots, d-1$. These rates correspond to the following events: a particle diffusing to a neighbouring cell, a particle drifting to a neighbouring cell, a cell giving particle birth or particle death. Once the procedure recursively locates a random "target" cell $\eta_C$, the procedure adjusts the particle count according the overall rate of the target cell to simulate births, deaths, drift, and diffusion. Once appropriate particle adjustments are performed, rates for $\eta_C$ and neighbour$(\eta_C, \pm e_i)$, $i=0,1, \ldots, d-1$ are recalculated and summed up the tree.

Carefully differencing bi-directional particle diffusion rates into uni-directional rates and then differencing in and out flow rates from neighbouring cells yields rate cancellations that lead to a lower overall summed rate found in λ(tree(F)). The benefit of all rate reduction is typically a fast, accurate approximation to the optimal filter (equation 6), with less simulation noise as compared to more direct potential Markov chain approximations. Thus, the REST filter implements a births and deaths only method by considering the rate net flow of particles. For a non-measure-valued signal process, we define the averaged versions for $\alpha(x)$, $\tau_j(x)$ and $v(x)$ from equation 3 for cell $\eta_C$ by $$a(\eta_C, i, j) := \frac{N(F, 0) \times N(F, 1) \times \cdots \times N(F, d-1)}{L_0 \times L_1 \times \cdots \times L_{d-1}} \int_{l(\eta_C)} a_{ij}(x) dx,$$

$$v(\eta_C) := \frac{N(F, 0) \times N(F, 1) \times \cdots \times N(F, d-1)}{L_0 \times L_1 \times \cdots \times L_{d-1}} \int_{l(\eta_C)} v(x) dx, \text{ and}$$

$$\tau(\eta_C, j) := \frac{N(F, 0) \times N(F, 1) \times \cdots \times N(F, d-1)}{L_0 \times L_1 \times \cdots \times L_{d-1}} \int_{l_k^N} \tau_j(x) dx,$$

respectively, for $0 \leq i,j \leq d-1$.

The birth and death rate for cell $\eta_C$ is defined by the following formulas $$\lambda_{birth}(\eta_C) = \quad (16)$$

$$\left[ v(\eta_C)pc(\eta_C) + \sum_{j=0}^{d-1} \tau(\eta_C, j) \times \frac{N(F,j)}{L_j} \times \right.$$
$$(pc(\text{neighbour}(\eta_C, +e_j)) - pc(\eta_C)) +$$
$$\sum_{i,j=0}^{d-1} \frac{1}{2} a(\eta_C, i, j) \times \frac{N(F, i) \times N(F, j)}{L_i \times L_j} \times$$
$$\left[ pc(\text{neighbour}(\eta_C, +e_i)) - pc(\eta_C) \right.$$
$$\left. \left. -pc(\text{neighbour}(\eta_C, +e_i - e_j)) + pc(\text{neighbour}(\eta_C, -e_j)) \right] \right]^+$$

-continued $$\lambda_{death}(\eta_C) =$$

$$\left[ v(\eta_C)pc(\eta_C) + \sum_{j=0}^{d-1} \tau(\eta_C, j) \times \frac{N(F,j)}{L_j} \times \right.$$
$$(pc(\text{neighbour}(\eta_C, +e_j)) - pc(\eta_C)) +$$
$$\sum_{i,j=0}^{d-1} \frac{1}{2} a(\eta_C, i, j) \times \frac{N(F, i) \times N(F, j)}{L_i \times L_j} \times$$
$$\left[ pc(\text{neighbour}(\eta_C, +e_i)) - pc(\eta_C) \right.$$
$$\left. \left. -pc(\text{neighbour}(\eta_C, +e_i - e_j)) + pc(\text{neighbour}(\eta_C, -e_j)) \right] \right]^-$$

In the case for multi-target tracking using a counting measure valued signal process, the rates are highly problem dependent and thus not provided herein for simplicity reasons.

The recursive procedure for selecting a "target" cell node is computed in O(log(n)) complexity by randomly visiting either the left or right sub-tree nodes of $\eta_T$. This decision is based on a uniform random variable U which is compared to a ratio based on the left and right child summed rate totals ($\lambda(\text{left}(\eta_T))$ and $\lambda(\text{right}(\eta_T))$, respectively), analogous to the summed particle count totals of equation 11. Evolving the filter's distribution forward by some time typically involves many simulations of birth/death events; each of these simulation of events is associated with the computations involved in traversing the index binary tree from root-to-leaf.

To further minimize the number of traversals, the REST filter accepts a parameter number_of_events(F)≧1 for the number of simultaneous events it can simulate in one traversal of the binary tree. There exists a trade off between computation time and exactness of solutions for this type of approximation; smaller number_of_events(F) yields more exact solutions but requires more traversals. There is also a trade-off in accuracy of solution, independent of computation time, for a given number of particles and mesh size. Collecting, canceling, and evenly distributing more events produces less simulation noise, but also causes a less accurate implementation of the signal law generator. This results from the recursive and random splitting of number_of_events(F) events from root node down to the leaf cell nodes.

The procedure for pushing down quantized integer units from the root tree(F) to leaf cell nodes based on probabilities computed from stored sums found in tree nodes will herein be referred to as the "push down technique." The elements to push down for evolving the distribution are "events," while other types of elements used by the push-down-technique are particles (see, for example, the procedures for particle control described in the section entitled "Particle Control"), and imaginary times (see, for example, the procedures described in the section entitled "Distribution Evolution: The Other Case"). For sufficiently large number_of_events(F), not only is the push-down-technique more efficient, but also removes simulation randomness as compared to a one-by-one event simulation. The worst case complexity for simulating any arbitrarily large number of events simultaneously is linear O(n) with respect to the number of leaf nodes n.

"Distribution Evolution: The Other Case"

The description for evolving the conditional distribution as described above is for the particular cases such as when the signal dynamics are modeled by a time-homogeneous SDE (equation 1). In the case where a filtering problem presents the target signal as a time-inhomogeneous SDE, REST's method for evolving the conditional distribution is implemented via time-dependent imaginary times, instead of summed rates. Each unit of imaginary time represents a birth or death of a particle in a cell. The imaginary times are calculated in each cell node and then recursively summed up the tree. The total sum of imaginary times O(tree(F)) is then quantized to an integer by either rounding up or down (based on some probability), and then pushed back down to the leaf nodes via the push down technique as described herein.

The time-dependent imaginary times implementation for evolving the conditional distribution ε time forward is as follows:

1. Let t represent the global time and Δt be some small time step.
2. Initialize a local variable clock S=0 to represent the current simulated time for this evolution between observations.
3. The recursive sums of imaginary times are stored in the internal nodes of tree(F) and are calculated by the following formulas, $$O(\eta_T) = O(\text{right}(\eta_T)) + O(\text{left}(\eta_T))$$

$$O(\eta_C) = O_{birth}(\eta_C) + O_{death}(\eta_C)$$

where the total sum for all live cells is stored in O(tree(F)). The first formula will recurse down through the tree nodes until it reaches the base case, which is a cell node. It then uses the second formula to calculate the total imaginary time for that node. If the global clock is zero t=0, then there are no accumulated imaginary times for all cells (i.e., O(tree(F))=0.

4. While S<ε
  (a) Obtain an occurrence of an independent 1-Exponential random variable E, or set E=1 as described herein to remove simulation randomness. In the case where a simultaneous multiple push down approximation is desired, set E=number_of_events(F). In this time-inhomogeneity case number_of_events(F) denotes the number of simultaneous quantized imaginary times to push down.
  (b) While the accumulated sum of imaginary times is less than E, keep accumulating the imaginary times in each cell by $$O_{birth}(\eta_C) = O_{birth}(\eta_C) + \left[ v_t(\eta_C)pc(\eta_C) + \sum_{j=0}^{d-1} \tau_1(\eta_C, j) \times \frac{N(F,j)}{L_j} \times (pc(\text{neighbour}(\eta_C, +e_j)) - pc(n_C)) + \sum_{i,j=0}^{d-1} \frac{1}{2} a_t(\eta_C, i, j) \times \frac{N(F,i) \times N(F,j)}{L_i \times L_j} \times \begin{bmatrix} pc(\text{neighbour}(\eta_C, +e_i)) - pc(\eta_C) \\ -pc(\text{neighbour}(\eta_C, +e_i - e_j)) + pc(\text{neighbour}(\eta_C, -e_j)) \end{bmatrix} \right]^+ \times \Delta t$$

$$O_{death}(\eta_C) = O_{death}(\eta_C) + \left[ v_1(\eta_C)pc(\eta_C) + \sum_{j=0}^{d-1} \tau_1(\eta_C, j) \times \frac{N(F,j)}{L_j} \times (pc(\text{neighbour}(\eta_C, e_j)) - pc(\eta_C)) + \sum_{i,j=0}^{d-1} \frac{1}{2} a_t(\eta_C, i, j) \times \frac{N(F,i) \times N(F,j)}{L_i \times L_j} \times \begin{bmatrix} pc(\text{neighbour}(\eta_C, +e_i)) - pc(\eta_C) \\ -pc(\text{neighbour}(\eta_C, +e_i - e_j)) + pc(\text{neighbour}(\eta_C, -e_j)) \end{bmatrix} \right]^- \times \Delta t.$$

$a_t(\eta_C, i, j)$, $v_t(\eta_C)$, $\tau_t(\eta_C, j)$ are the time-inhomogeneous versions for $a(\eta_C, i, j)$, $v(\eta_C)$, $\tau(\eta_C, j)$ in equation 16. Note that the global clock for time t is incremented by Δt for each iteration and thus $a_t(\eta_C, i, j)$, $v_t(\eta_C)$, $\tau_t(\eta_C, j)$ are constantly changing due to their inhomogeneous nature. In the case of a measure-valued process, a different, problem dependent calculation would be used.

(c) Push down the accumulated imaginary times by invoking the recursive push down method from the root tree node down to the leaf cell nodes PUSH_DOWN_TIMES_TREE(tree(F),⌊E⌋) (see FIG. 7–8). Note that if E=1 or E was generated by a 1-Exponential random variable, only one event is pushed down (i.e., PUSH_DOWN_TIMES_TREE(tree(F), 1)).
  (d) For all live cells the birth and death times are decremented in the following manner.

$$O_{birth}(\eta_C) = O_{birth}(\eta_C) - \frac{O_{birth}(\eta_C)}{O(tree(F))}$$

$$O_{death}(\eta_C) = O_{death}(\eta_C) - \frac{O_{death}(\eta_C)}{O(tree(F))}.$$

(e) Update the simulated time clock S=S+E.

In the case where the signal is modeled by a discrete-time Markov process, the evolution procedure is quite similar. In this case, the imaginary times are calculated and pushed down at the appropriate discrete intervals much like the imaginary observation times described in the next section.

"Resampling REST's Distribution: Imaginary Observation Times"

When an observation $Y_{t_m}$ is received by the REST filter at time $t_m$ (block 14), the estimated conditional distribution is updated (i.e., resampled) by particle count adjustments in cells (see block 16 of FIG. 1). The resampling procedure is illustrated in FIGS. 6, 7, and 8. To handle the time inhomogeneous nature of the observation update, we use the notion of imaginary time as described, for example, in the section entitled "Distribution Evolution: The Other Case" herein. Imaginary observation time depends both on the current observation received and the current state of REST.

Let Φ(x) be the density function that models the random noise variable $W_{t_m}$ from equation 4, $G(X_{t_m}, Y_{t_m}) = W_{t_m}$ be the inverse map for equation 4, and J be the Jacobian matrix of $G(X_{t_m}, Y_{t_m})$ with respect to $$Y_{t_m}, J_{i,j} = \frac{\partial G^i(X_{t_m}, Y_{t_m})}{\partial Y_{t_m}^j}.$$

To account for the observation information $Y_{t_m}$, a value $O_{birth}(\eta_C)$ and $O_{death}(\eta_C)$ is calculated for each live cell by the positive and negative parts of the formula $$O_{birth}(\eta_C) = O_{birth}(\eta_C) + \left[ pc(\eta_C) \times \frac{\Phi(G(X_{t_m}, Y_{t_m}))|J|}{\Phi(Y_{t_m})} \right]^+ \quad (17)$$

$$O_{death}(\eta_C) = O_{death}(\eta_C) + \left[ pc(\eta_C) \times \frac{\Phi(G(X_{t_m}, Y_{t_m}))|J|}{\Phi(Y_{t_m})} \right]^-,$$

where |J| is determinant of matrix J. In the case for additive zero mean Gaussian noise (equation 5), the above equation becomes $$O_{birth}(\eta_C) = O_{birth}(\eta_C) + \left[ pc(\eta_C) \times \left\{ \exp\left( \frac{h(\eta_C) Y_{tm}}{\varepsilon \sigma^2} - \frac{h(\eta_C)^2}{2\varepsilon \sigma^2} \right) - 1 \right\} \right]^+ \quad (18)$$

$$O_{death}(\eta_C) = O_{death}(\eta_C) + \left[ pc(\eta_C) \times \left\{ \exp\left( \frac{h(\eta_C) Y_{tm}}{\varepsilon \sigma^2} - \frac{h(\eta_C)^2}{2\varepsilon \sigma^2} \right) - 1 \right\} \right]^-,$$

where $$h(\eta_C) := \frac{N(F, 0) \times N(F, 1) \times \ldots \times N(F, d-1)}{L_0 \times L_2 \times \ldots \times L_{d-1}} \int_{l(\eta_C)} h(x) dx$$

is the sensor function h averaged over cell ($\eta_C$) and $\sigma^2$ is the variance for the Gaussian noise from equation 5.

As described, for example, in the section entitled "Distribution Evolution: The Other Case", the imaginary observation times are summed up the tree and then pushed down to the cells where particle count adjustments are made. The integer portion of each cell's imaginary observation time may instead be enacted immediately when times are calculated by adjusting the cell's particle count. This prevents the summed observation time at the top of the tree from becoming too large.

Unlike other recently used particle system methods, the REST filter does not resample its distribution via individual particle-by-particle treatment. Instead, the discrete-space implementation of REST groups nearby particles into cells. Therefore, observation-dependent resampling is performed more efficiently via cell-by-cell treatments. Furthermore, REST's cell-by-cell treatment and push-down-technique is exploited in its particle control procedures.

"Particle Control"

To ensure calculation workloads during both REST's distribution evolution and during REST's resampling procedures remain relatively constant, two types of particle control procedures are employed to keep the number of particles in the filter near a desired level (e.g., near to the filter's initial particle count original_pc(F)).

The first type of particle control is the introduction of a competing rate in the simultaneous push down of events during REST's distribution evolution (see FIG. 3). A particle control rate pc_rate(F) is calculated to compete against the summed $\lambda$(tree(F)) at the root tree node level. Before any pushing down of events occur, the REST filter randomly selects either a particle control driven simulation of events or the usual simultaneous number_of_events(F) events simulation. This random selection is based on a probability calculated from pc_rate(F) and $\lambda$(tree(F)) (see FIG. 3). An example for pc_rate(F) that may be used is calculated by $$pc\_rate(F) = (pc(tree(F)) - original\_pc(F))^2. \quad (19)$$

This type of particle control involves the simulation of events, and like the simulation for evolving the conditional distribution (as described, for example, in the section entitled "Evolving REST's Distribution Between Observations"), this type of particle control is executed via the push-down-technique based on the tree node summed rates $\lambda(\eta_T)$. Unlike evolving the conditional distribution, where number_of_events(F) events are pushed down the tree simultaneously, this type of particle control is performed with the difference between the current total particle count and the initialized particle count |pc(tree(F))−original_pc(F)| as the number of events being pushed down. Furthermore, the local variable S in FIG. 3 represents the current simulated time for evolving the conditional distribution, and is not updated after the particle control. This ensures the particle control will not interfere with the regular evolution of the distribution.

The second type of particle control is performed after the resampling of the distribution (block 16). This particle control procedure is performed via a particle control push-down-technique described in FIGS. 9 and 10. Instead of simulating events based on $\lambda(\eta_T)$, the quantized units to push down in this type of particle control are particle control births or deaths depending on whether (pc(tree(F))−original_pc(F)) is positive or not. Unlike the particle control events used during the distribution evolution, the particle control after the resampling of the distribution are split from the root tree(F) down to the leaf cells nodes based on the recursive summed particle counts pc($\eta_T$) (see equation 11) stored in each internal tree node, and not of summed rates $\lambda(\eta_T)$. This simultaneous multiple push down technique is devised to add minimal amounts of additional noise and is performed in conjunction with the births and deaths from observations and "particle movement."

In the case that the REST filter is being used for model selection, it is important to retain the unnormalized filtering distribution. Particle control is a form of normalization and so, if model selection is desired, the REST filter will track all particle control actions to allow the true unnormalized distribution to be recovered.

"Pruning Tree(F): Dynamic Cell Removal/Creation"

For procedures that utilize the push down technique paradigm, such as evolving the conditional distribution (as described, for example, in the section entitled "Evolving REST's Distribution Between Observations"), the observation dependent distribution resampling the procedure (as described, for example, in the section entitled "Resampling REST's Distribution: Imaginary Observation Times"), and both particle controls (as described, for example, in the section entitled "Particle Control"), the computational workload is proportional to height of the tree which is highly dependent upon the number of leaf node cells stored in the tree (and inversely proportional to cell size).

By setting the convention that leaf node cells are not stored in the tree when they have no particles (i.e., pc($\eta_C$) =0), the REST filtering device can "prune" zero particle count leaf cell nodes without any loss of information in the estimated conditional distribution. This dramatically decreases the number of leaf cell nodes to store and process. Moreover, pruning leaf nodes reduces the height of the tree by removing the direct parent tree node parent($\eta_C$) for every $\eta_C$ cell pruned. This ensures a consistent binary tree. The push down technique which is used extensively by the REST filter has far fewer tree nodes to visit after pruning and therefore can perform more efficiently. The binary tree is kept relatively balanced by the DIBE indexing. By continually pruning the tree so that it only contains cells where particles are located, the storage and computational advantages of particle filters are retained, or even surpassed. The procedure for pruning zero leaf cell nodes is illustrated in FIGS. 11 and 12.

The procedure starts from the root node tree(F), and recursively visits every leaf node cell. At the leaf node level, the procedure checks whether the cell needs to be pruned. If so, it deletes the cell and returns NULL. If NULL is returned to the calling parent tree node, the tree node itself is also deleted and then recursively returns the other sub-tree. In the case where both left and right children return NULL, the tree node is deleted, and NULL is returned to its parent. Deletions of tree nodes ends when pruning the left and right sub-trees both return non-NULL values.

Along with the procedure for dynamic removal of zero particle cells is a dynamic cell creation procedure when a deleted cell is needed (e.g., has a particle birth). The dynamic creation of a cell is performed when a particle is diffused from a cell to its deleted neighbour during the evolution of the distribution. Therefore, in addition to $\lambda_{birth}(\eta_C)$ and $\lambda_{death}(\eta_C)$, the REST filter stores the birth rates for non-existing neighbouring cells for all directions $\pm e_l$, $l=0,1, \ldots, d-1$ in cell $$\eta_C . \lambda_{birth}^{neighbour}(\eta_C, \pm e_l)$$

and is calculated by, $$\lambda_{birth}^{neighbour}(\eta_C, \pm e_1) = \qquad (20)$$

$$\left[ \begin{array}{c} \sum_{j=0}^{d-1} \tau(\text{neighbour}(\eta_C, \pm e_l), j) \times \\ \frac{N(F, j)}{L_j} pc(\text{neighbour}(\eta_C, \pm e_l + e_j)) + \\ \sum_{i,j=0}^{d-1} \frac{1}{2} a(\text{neighbour}(\eta_C, \pm e_l), i, j) \times \frac{N(F, i) \times N(F, j)}{L_i \times L_j} \times \\ \left[ \begin{array}{c} pc(\text{neighbour}(\eta_C, \pm e_l + e_i)) \\ -pc(\text{neighbour}(\eta_C, \pm e_l + e_i - e_j)) \\ +pc(\text{neighbour}(\eta_C, \pm e_l - e_j)) \end{array} \right] \end{array} \right]^+ \times$$

$$1_{\text{neighbour}(\eta_C, \pm e_l) \notin \text{live\_cells}(F)},$$

where $1_{\text{neighbour}(\eta_C, \pm e_l) \notin \text{live\_cells}(F)}$ is the indicator function for when a neighbour cell does not exit in the $\pm e_l$ direction neighbour$(\eta_C, \pm e_l)$=NULL.

"The Refining Grid: Splitting and Merging Cells"

The precision of the estimated conditional distribution is inversely related to the cell size (or proportional to N(F)), whereas the computational time is proportional to the cell size (and inversely proportional to N(F)). The REST filter dynamically splits and merges the grid in the most profitable/critical dimensions to optimize the tradeoffs.

With no initial locational knowledge of the signal, the filter is typically initialized with a large cell size and particles relatively evenly distributed over the whole signal state space. Under the influence of the observation sequence, particles often coalesce in a particular dimension(s), thereby isolating the target signal. Due to removal of zero particle cells, the number of live cells decreases (e.g., pruning of such cells), allowing for more smaller sized cells to be considered with relatively the same computational workload as fewer larger cells. The cell sizes are automatically halved in the dimension deemed to be the most advantageous to split, creating a powerful dimension-by-dimension "zooming in," or refining feature. Likewise, if the signal is temporarily lost (due to severely corrupted observations) "zooming out" occurs. The effect is that computations remain relatively constant and fidelity of estimates are as accurate as the state of the observation dependent filtering process at that time.

One possible embodiment of a procedure for determining whether to either split, merge or leave the grid N(F) alone is shown in FIGS. 13A–13B. If number_of_live_cells(F) is smaller than the parameter live_cells_lower_bound(F), the device splits the grid in the dimension with the least occupied cells. If number_of_live_cells(F) is greater than parameter live_cells_upper_bound(F), the device merges the grid in the dimension with the most occupied cells.

Refining the grid involves either one of two procedures, depending on whether the device chooses to split or merge its grid. The first is a procedure for recursively merging the root's left and right sub-trees (illustrated in FIGS. 14A–14B and 15). FIG. 15 shows how to combine the particles at the leaf node level with its neighbouring cell in the merging dimension. This coarser grid decreases the number of live cells. The second is the procedure for splitting all live cells in two via a recursive duplication of the tree from root tree(F) to leaf cell nodes (illustrated in FIGS. 16 and 17). This is followed by the joining of the two "sub"-trees to a newly created root (see FIG. 13). Both procedures have approximately O(nlog(n)) complexity and do not reconstruct the tree from scratch, but instead modify the tree using the recursive cells shown in FIGS. 14 and 16. Therefore, refining REST's grid is computationally very fast.

When REST splits or merges its grid in any dimension (the most profitable/critical at that time), a cell's DIBE index (see equation 15) and the corresponding DIBE indexed tree may need to be dimensionally reordered. Although reordering a cell's DIBE index is simply the recalculation of index($\eta_C$) with the newly reordered dimension_order(F,i), $0 \le i \le d-1$, reordering the DIBE indexed tree is slightly more complex. Suppose $j \in 0,1, \ldots, d-1$ denotes the most profitable/critical dimension. Then, the procedure for reordering the DIBE indexed tree to conform to the new dimension_order(F) after a split/merge transformation in the jth dimension involves (j+1) mod d/j successive calls to the recursive procedure, which reorders the DIBE-indexed tree one dimension at a time. This reordering of REST's DIBE-indexed tree is described in FIGS. 18–23.

Due to the removal of zero particle cells, the height of the DIBE indexed tree is not constant and therefore requires non-trivial solutions to reorder. Therefore, a tree node $\eta_T$ has a member data to keep track of which binary digit separates the left and right sub-trees according to the leaf cell nodes index (index($\eta_C$)). The member data is stored in each tree node and is labeled as level($\eta_T$). The level for tree node $\eta_T$ is $$\text{level}(\eta_T) = \min k: l_k \ne r_k, k=0,1,2, \ldots, \text{bits}(F), \qquad (21)$$

where $l_k$ and $r_k$ is the kth binary digit for index(left(($\eta_T$))) and index(right(($\eta_T$))), respectively (see equation 10 for usage of level($\eta_T$)).

The recursive reordering procedure on the tree utilizes the information stored in level($\eta_T$) (see FIGS. 18–22) and the resulting tree after the (j+1) mod d/j reordering calls is now in the correct DIBE dimension order for either the recursive split or merge routine.

When reordering the DIBE indexed tree, the device must first identify which of the 9 case scenarios (FIGS. 23 Case_1 to FIG. 23 Case_9) the particular tree node belongs to. This is achieved through various testings of node indices and levels (see Equation 10). FIGS. 18 to 22 illustrate the complexity of such classifications.

Because of its discrete-space representation and its direct approximation of the conditional distribution, REST can often be initialized with few particles and large cells to represent an initial uniform distribution, whereas continuous space particle filters would require more particles to obtain similar accuracy and coverage. Another feature of at least one embodiment of REST is that it can accommodate parameter estimation automatically, simply because it fine-tunes cell size automatically.

In the case of a measure-valued signal process, the splitting and merging procedure is slightly different. The procedure involves normal splitting or merging of the measure space and then adapting the cells to this new measure space. The algorithm for this shall not be provided in any further detail as it is substantially problem dependent.

SUMMARY

In summary, the REST filter adjusts particle counts in cells in a manner such that they conform to a sequence of observed measurements, and then uses these cells with their particle counts to provide parameter estimates, signal detection, tracking, and predicting estimates to the conditional distributions of the signal state. These distributions can be used to provide a human display interface or to control automated systems.

REST filter's conditional probability estimate at time $t_m$ is calculated by $$P(X_{t_m} \in A \mid Y_{t_0}, Y_{t_1}, \ldots, Y_{t_m}) \approx \sum_{\eta_C \in \text{live\_cells}(F)} \frac{pc(\eta_C)}{pc(tree(F))} \frac{|\eta_C \cap A|}{|\eta_C|}, \quad (22)$$

where $|B|$ denotes Lebesque measure of set B, pc(tree(F)) is the total number of particles at time $t_m$, and $pc(\eta_C)$ is the number of particles in cell $\eta_C$ at time $t_m$. Predictions are then made for $t_m+\kappa$ by making a copy of the current conditional distribution at time $t_m$, and then evolving forward the system $\kappa$ time units $$P(X_{t_m+\kappa} \in A \mid Y_{t_0}, Y_{t_1}, \ldots, Y_{t_m}) \approx \sum_{\eta_C \in \text{live\_cells}(F)} \frac{pc(\eta_C)}{pc(tree(F))} \frac{|\eta_C \cap A|}{|\eta_C|}, \quad (23)$$

where $\eta_C^{copy}$ and $F^{copy}$ are the copied and $\kappa$ time units evolved states for $\eta_C$ and F without the influence of observations arriving after $t_m$.

All patents and references disclosed herein are incorporated by reference in their entirety, as if individually incorporated. The preceding specific embodiments are illustrative of the practice of the present invention. It is to be understood, therefore, that other expedients known to those skilled in the art or disclosed herein may be employed without departing from the invention or the scope of the appended claims.

What is claimed is:

1. A real-time method for use in estimating a conditional probability distribution of a current signal state and/or a future signal state for a non-linear random dynamic signal process, the method comprising:

providing sensor measurement data associated with the non-linear random dynamic signal process, wherein the sensor measurement data is dependent upon some component of a signal up to the current time; and defining a filter operating on the sensor measurement data by directly discretizing both amplitude and signal state domain for an unnormalized or normalized conditional distribution evolution equation, wherein the discretization of the signal state domain results in creation of a grid comprising a plurality of cells and the discretization in amplitude results in a distribution of particles among the cells via a particle count for each cell, wherein a state of the filter distribution is stored.

2. The method of claim 1, wherein the method further comprises evolving the filter distribution between a first instant of time, t–ϵ, and a second instant in time, t, wherein evolving the filter distribution comprises moving particles between cells and/or creating births and deaths of particles within cells at state dependent rates.

3. The method of claim 2, wherein evolving the filter distribution further comprises differencing, for each cell, particle birth and death rates to provide a reduced number of birth and death events for the cell.

4. The method of claim 2, wherein evolving the filter distribution further comprises differencing, for each cell, flow rates of particles in and out of a cell from flow rates in and out of neighboring cells to provide a reduced net flow of particles for the cell.

5. The method of claim 2, wherein the rates for particle deaths within a cell and particle movement out of that cell are both subtracted from the sum of the rates of particle movement into the cell and particle births in the cell, creating a reduced combined net rate for each cell, wherein evolving the filter distribution comprises creating a reduced combined net rate for each of the cells.

6. The method of claim 1, wherein the filter distribution is initialized with an initial count of particles, wherein the method further comprises evolving the filter distribution between a first instant of time, t–ϵ, and a second instant in time, t, and further wherein the method comprises controlling the total number of particles in the filter distribution while evolving the filter distribution to maintain the number of particles near a desired level.

7. The method of claim 1, wherein the method further comprises evolving the filter distribution between a first instant of time, t–ϵ, and a second instant in time, t, wherein evolving the filter distribution comprises replacing 1-exponential times for simulation of events between the first instant of time and the second instant in time, as used in Markov chains, by the fixed value 1.

8. The method of claim 1, wherein a state of the filter distribution is stored as a tree comprising at least a plurality of leaf nodes, wherein the tree is representative of a subset of cells along with associated rate information and particle count information for each cell, wherein each leaf node corresponds to one of the plurality of cells that contain particles.

9. The method of claim 8, wherein the tree stores leaf nodes indexed by a dimensionally interleaved binary expansion (DIBE) index.

10. The method of claim 8, wherein the method further comprises dynamically removing a leaf node corresponding to a cell when that cell has an associated particle count that falls below a predetermined limit.

11. The method of claim 8, wherein the method further comprises dynamically adding a leaf node corresponding to a cell when that cell would have, via one or more particle birth events, an associated particle count that rises above a predetermined limit.

12. The method of claim 8, wherein the method further comprises dynamically refining the grid to split one or more of the plurality of cells into neighboring cells and/or merging the grid to combine neighboring cells into a single cell.

13. The method of claim 12, wherein dynamically refining the grid comprises recursive duplication of cloned versions of all tree nodes and leaf nodes of the tree for use when cells represented by the leaf nodes split.

14. The method of claim 12, wherein dynamically refining the grid comprises recursive folding of right and left sub-trees of tree nodes and leaf nodes of the tree for use when cells represented by the leaf nodes merge.

15. The method of claim 12, wherein dynamically refining the grid comprises reordering the tree, to maintain proper DIBE indexing throughout the tree, before splitting and/or merging one or more cells without tree reconstruction.

16. The method of claim 8, wherein one or more non-leaf nodes of the tree comprise at least one of sum of rate information, imaginary observation time information, and particle count information.

17. The method of claim 8, wherein the filter distribution is initialized with an initial count of particles, and wherein the method further comprises controlling the total number of particles in the filter distribution to maintain the number of particles near a predetermined level, wherein controlling the total number of particles is performed using a tree push down technique of birth and death events.

18. The method of claim 1, wherein the method further comprises evolving the filter distribution between a first instant of time, t−ϵ, and a second instant in time, t, and further wherein the method comprises updating the evolved filter distribution as a function of sensor measurement data on a cell by cell basis.

19. The method of claim 18, wherein the filter distribution is initialized with an initial count of particles, and wherein the method further comprises controlling the total number of particles in the filter distribution after updating the evolved filter distribution to maintain the number of particles near a desirable level.

20. The method of claim 1, wherein the method comprises computing estimates of the conditional probability distribution based upon the filter distribution.

21. The method of claim 1, wherein the method further comprises providing multiple grids for use in comparing validity of and/or selection between various signal and observation models.

22. The method of claim 1, wherein the grid functions in a space of counting measures so as to permit tracking of an arbitrary unknown number of targets.

23. A computer readable medium comprising a program operable in conjunction with one or more processors of a computer system to implement a filter for use in estimating a conditional probability distribution of a current signal state and/or a future signal state for a non-linear random dynamic process, wherein the program is operable to:
recognize sensor measurement data associated with the non-linear random dynamic signal process, wherein the sensor measurement data is dependent upon some component of a signal up to the current time; and
define a filter operating on the sensor measurement data by directly discretizing both amplitude and signal state domain for an unnormalized or normalized conditional distribution evolution equation, wherein the discretization of the signal state domain results in creation of a grid comprising a plurality of cells and the discretization in amplitude results in a distribution of particles among the cells via a particle count for each cell, wherein a state of the filter distribution is stored.

24. The computer readable medium of claim 23, wherein the program is further operable to evolve the filter distribution between a first instant of time, t−ϵ, and a second instant in time, t, wherein evolving the filter distribution comprises moving particles between cells and/or creating births and deaths of particles within cells at state dependent rates.

25. The computer readable medium of claim 24, wherein the program is further operable to difference, for each cell, particle birth and death rates to provide a reduced number of birth and death events for the cell.

26. The computer readable medium of claim 24, wherein the program is further operable to difference, for each cell, flow rates of particles in and out of a cell from flow rates in and out of neighboring cells to provide a reduced net flow of particles for the cell.

27. The computer readable medium of claim 24, wherein the rates for particle deaths within a cell and particle movement out of that cell are both subtracted from the sum of the rates of particle movement into the cell and particle births in the cell, creating a reduced combined net rate for each cell, wherein the program is further operable to evolve the filter distribution by creating a reduced combined net rate for each of the cells.

28. The computer readable medium of claim 23, wherein the state of the filter distribution is provided for storage by the program as a tree comprising at least a plurality of leaf nodes, wherein the tree is representative of a subset of cells along with associated rate information and particle count information for each cell, wherein each leaf node corresponds to one of the plurality of cells that contain particles.

29. The computer readable medium of claim 28, wherein the tree stores leaf nodes indexed by a dimensionally interleaved binary expansion (DIBE) index.

30. The computer readable medium of claim 28, wherein the program is further operable to dynamically remove a leaf node corresponding to a cell when that cell has an associated particle count that falls below a predetermined limit.

31. The computer readable medium of claim 28, wherein the program is further operable to dynamically add a leaf node corresponding to a cell when that cell would have, via one or more particle birth events, an associated particle count that rises above a predetermined limit.

32. The computer readable medium of claim 28, wherein the program is further operable to dynamically refine the grid to split one or more of the plurality of cells into neighboring cells and/or merge the grid to combine neighboring cells into a single cell.

33. The computer readable medium of claim 23, wherein the program is further operable to evolve the filter distribution between a first instant of time, t−ϵ, and a second instant in time, t, and further wherein the method comprises updating the evolved filter distribution as a function of sensor measurement data on a cell by cell basis.

34. The computer readable medium of claim 23, wherein the program is further operable to compute estimates of the conditional probability distribution based upon the filter distribution.

35. The computer readable medium of claim 23, wherein the program is further operable to define the grid to be functional in a space of counting measures so as to permit tracking of an arbitrary unknown number of targets.

36. The computer readable medium of claim 23, wherein the program is further operable to initialize with an initial count of particles and control the total number of particles in the filter distribution while evolving the filter distribution or after update of the filter distribution to maintain the number of particles near a desired level.

* * * * *